United States Patent
McCune et al.

4,016,405
Apr. 5, 1977

[54] CARD VALIDATION, METHOD AND SYSTEM

[75] Inventors: Harold K. McCune, Thornville, Ohio; Michael R. Kronewitter, Marietta, Ga.

[73] Assignee: Diebold, Incorporated, Canton, Ohio

[22] Filed: June 9, 1975

[21] Appl. No.: 585,401

[52] U.S. Cl. .................. 235/61.7 B; 340/149 A
[51] Int. Cl.² .................. G06K 7/01; H04Q 5/02
[58] Field of Search ............ 235/61.7 B; 340/149 A

[56] References Cited
UNITED STATES PATENTS

| | | | |
|---|---|---|---|
| 3,665,162 | 5/1972 | Yamamoto et al. | 235/61.7 B |
| 3,761,682 | 9/1973 | Barnes et al. | 235/61.7 B |
| 3,761,683 | 9/1973 | Rogers | 235/61.7 B |
| 3,794,813 | 2/1974 | Spetz | 235/61.7 B |
| 3,824,375 | 7/1974 | Gross et al. | 235/61.7 B |
| 3,862,716 | 1/1975 | Black et al. | 235/61.7 B |

*Primary Examiner*—Daryl W. Cook
*Attorney, Agent, or Firm*—Frease & Bishop

[57] ABSTRACT

A verification method and system for determining whether a holder of a card is authorized to complete a transaction through an on-line terminal of an institution in a network of cooperating institutions, such as banks. The method and system are also useable in such applications as accessing a security data file in a computer, entering a security area, completing a point of sale transaction and operating on-line automated tellers in banks. In the preferred embodiment, the card contains information including first data identifying the institution holding an account of an authorized card holder and second data identifying the account. The first and second data are machine read from the card and a secret number, derived from the data but known only to the authorized holder of the card, is keyboard entered by the card holder. The first data are used to address a read only memory having random characters stored therein. Random character digits outputted from the memory are successively exclusive ORed with each digit of the second data and the resultant applied to the address terminals of the memory to cause pseudo-random vectoring among random data stored in the memory. Preselected digits of the characters generated by the memory are correlated to the digits of the secret number to generate a go-no go indication of whether the holder of the card is authorized to transact in the system. By the provision of an offset number on the card, all digits of the secret number can be selected by the holder of the card when the card is issued. The offset number converts the secret number digits selected by the card holder to digits which correspond to the preselected digits of the memory generated character. The card can be verified at any institution of a network of cooperating institutions having verification systems with identically programmed read only memories. The first data contained on the card cause the transaction to be charged against the institution holding the account and prevent comingling of transaction records among the cooperating institutions.

41 Claims, 9 Drawing Figures

CARD VALIDATION, METHOD AND SYSTEM

FIELD OF THE INVENTION

The present invention relates generally to card verification system and, more particularly, to a card verification system employing card contained data representing an institution number and account or identification number to generate a secret number by pseudo-randomly addressing a memory with the data.

BACKGROUND OF THE INVENTION

Machine readable identification cards in commercial transactions and other applications have become prevalent. For example, in security systems, and identification card is often presented to gain access to a guarded area. In credit card purchase transactions, a machine readable identification card, presented to a vendor, permits a credit card holder to debit an account held by the institution issuing the card. In commercial banking, limited service, unattended banking terminals have been provided using equipment responsive to a machine readable identification card. The card is often formed of a plastic medium and contains machine readable information in the form of, for example, embossed indicia, apertures, electrically conducting segments or magnetically recordable regions carrying a customer account number and other information, such as expiration date and customer status.

In an automated cash withdrawal system, the unattended bank terminal or automated teller, favorably responding to the machine readable card, advances money to the customer at any time of the day or night. A cash dispensing apparatus used in such a system is disclosed in copending application, Ser. No. 502,898, filed Sept. 3, 1974, now U.S. Pat. No. 3,943,335, commonly assigned with the present invention.

The unattended terminal has been designed as a stand-alone service unit. However, in order to extend the benefits of service and security of on-line systems to the stand-along units, the unattended banking terminal has since been merged into on-line processing system associated with each financial institution offering the service.

Typically, automated banking systems read data contained on the card, such as time period of authorization, authorized amount of transaction, data of last use, account balance, and account number. If the holder of the card is the authorized holder, the transaction requested, e.g., cash withdrawal, is processed. The processing operations include interrogating the account of the holder for adequate funds, debiting the account by the amount of the transaction and delivering cash to the customer. Such a system has resulted in the provision of efficient and economical banking available at any time of day or night.

A primary difficulty with prior automated banking stations, and with other systems utilizing machine readable identification media, has been system security. An extremely large volume of customer identification cards proliferated by a large number of institutions has created a widespread problem of participation by nonauthorized card holders. In view of a wide trafficking of stolen credit cards and counterfeiting of cards, a vendor or financial institution is no longer assured that the holder of the card is authorized to transact in the system.

To overcome this difficulty, it has been suggested to scramble the account number to develop a secret number which is revealed only to the authorized holder of the card at the time of issue. In use, the holder of the card enters the secret number into the system by way of a keyboard, or like device. The data contained on the card are read by a scanner at the terminal and are scrambled by a number translator. If the scrambled number favorably correlates with the secret number, the card holder is presumed authorized and the requested transaction is completed provided at least that the card is unexpired and adequate funds are in the account to cover the requested withdrawal.

Although the use of a secret number derived from data on the card for verification substantially enhances system security, the code for converting the account number to the secret number, although extremely difficult to ascertain, has occasionally been embarrassed by an unauthorized holder.

Systems have been developed for decreasing the possibility of an unauthorized card holder deriving the secret number from card contained data. For example, in the U.S. Pat. to Spetz No. 3,794,813, a verification system utilizes a truth table for deriving a secret number from the account number recorded on the card. Data for addressing the truth table are logically derived from arbitrarily selected bits from a field of digitally encoded digits contained on the card. In order to provide the arbitrary selection of digits contained on the card, a complex switching arrangement is provided for selectively sampling certain bits of binary encoded digits recorded on the card. A bank or other institution, once having arbitrarily chosen certain of the bits for forming address words for the truth table by operating the switching arrangement, is thereafter limited to that choice and the use of the card is limited to that bank or other institution.

While the unattended banking terminal has afforded the customer access to his account at any time of the day or night, he is still restricted to a geographical area in which the institution has installed terminals. It is highly desirable to also afford the customer access to his account through the terminal devices of other institutions whereby the customer is no longer restricted to a geographical area. Access to an account at one institution from another cooperating institution is referred to in the banking industry as interchange and is provided on a reciprocal basis wherein the cooperating institutions agree to exchange transactions over links between one-line systems.

In order to effect interchange capability in a card validation system, it is necessary to provide a system which is compatible among cooperating institutions in an interchange network, while avoiding comingling of accounting. Accordingly, it is necessary that a standard card be issued to all customers of the cooperating institutions, the cards being encoded to identify the particular institution holding the account while being processable by the terminal equipment of the cooperating institutions. There is a present need for a verification system which permits interchange between different cooperating institutions and is highly immune to unauthorized card holders.

In order to assure maximum security, it is imperative that the authorized holder of the card not record the secret number in a place which is accessible to a possible unauthorized user of the card. For example, should the authorized holder, to avoid forgetting the secret number, record the secret number on the surface of the card, the card could be used by an unauthorized holder because the unauthorized holder would be able to keyboard enter the secret number.

It has been proposed that the authorized holder of the card be permitted to select his own secret number when the card is issued as an aid to memory. For example, the authorized holder might choose the year of his birth as his secret number to minimize the chance that he would subsequently forget the number. In the U.S. Pat. to Stambler No. 3,786,420, issued Jan. 15, 1974, as an aid to security, a card validation system includes means for permitting a customer to select the first digit of a multidigit secret number at the time that the card is issued. However, the remaining digits of the secret number are then generated by the system and the multidigit secret number, issued to the authorized user, bears no ascertainable relation to the selected digit and does not serve as an aid to memory. It is desirable to provide a system of the character described which permits the authorized holder of the card to select all digits of his secret number whereby the selected number is made to correspond to data permanently recorded on the card prior to customer selection of the secret number.

OBJECTS OF THE INVENTION

It is, accordingly, one object of the present invention to provide a new and improved verification system and method.

It is another object of the present invention to provide a new and improved verification system and method in which a secret number is derived from data recorded on a card and wherein the data contained on the card and the secret numbe bear no ascertainable logical or mathematical relationship to each other.

It is still another object of the present invention to provide a verification system and method which provides interchange among cooperating institutions.

A further object of the present invention is to provide a new and improved verification system and method wherein all digits of a secret number can be selected by the customer when the card is issued.

BRIEF DESCRIPTION OF THE INVENTION

According to the present invention, in a method and system for verifying that the holder of an identification card is the authorized holder at any institution in a network of cooperating institutions, a card containing first and second data, e.g. institution identification number and account number, is machine read and translated into a different number which is correlated with a secret number entered by the card holder by any suitable means, such as a keyboard. If the translated number corresponds to the secret number, the requested transaction is completed and is charged to the institution identified by the first data. In translating the number, digits of the card contained data consecutively pseudo-randomly address a read only memory containing random characters (bytes each containing eight bits). In a first mode of operation, the digits of the institution identification number address the read only memory, causing a random output character to be generated therefrom. In a second mode of operation, a digit of the random output character is repeatedly logically combined, e.g. by an EXCLUSIVE OR operation, with each digit of the account number to form new data which are used to re-address the same memory as is addressed by the institution identification number, thereby to form a pseudo-random feedback addressing scheme. One of the digits, preferably the least significant digit of the account number, is again applied to pseudo-randomly address the memory and, in a third mode of operation, a digit of the final character, or Personal Identification Number (P.I.N.), generated by the memory is correlated with one digit of the secret number stored at the keyboard. Additional digits of the account number are similarly processed to form digits of the P.I.N. for one-by-one correlation with the remaining digits of the secret number and a favorable correlation between the digits of the secret number and the P.I.N. digits indicates that the holder of the card is the authorized holder.

Cooperating institutions having compatible terminal equipment and identically programmed read only memories verify the authenticity of the holders of cards issued by any of the cooperating institutions. Since the memories at each institution are identically programmed, a card bearing an institution identification number and account number, when applied to the number translator, cause a positively correlating P.I.N. to be generated at the verification system at any of the cooperating institutions. The system at each institution responding to the institution identification number recorded on the card causes the authorized transaction to be charged to the institution holding the account thereby providing interchange capability while avoiding comingling of accounting among the cooperating institutions.

To further enhance security, as an optional feature the keyboard entered secret number is used to address a second read only memory, the output of which is compared to the number generated by the number translator responsive to the card contained first and second data. A secret number selected by the customer when the card is issued may be used as an address for the second read only memory by including an offset number on the card. The offset number is combined with the secret number entered by keyboard to form an address byte and the second read only memory output is correlated to the P.I.N.

The described method and apparatus are applicable to environments other than banking. For example, a verification system of the type described can be used in such applications as accessing security files in a computer, gaining entry to a guarded area such as a warehouse and completing point of sale transactions, and others.

The above and still further objects, features and advantages of the present invention will become apparent upon consideration of the following detailed description of several specific embodiments thereof, especially when taken in conjunction with the accompanying drawing.

DETAILED DESCRIPTION OF THE DRAWING

Figure 1:
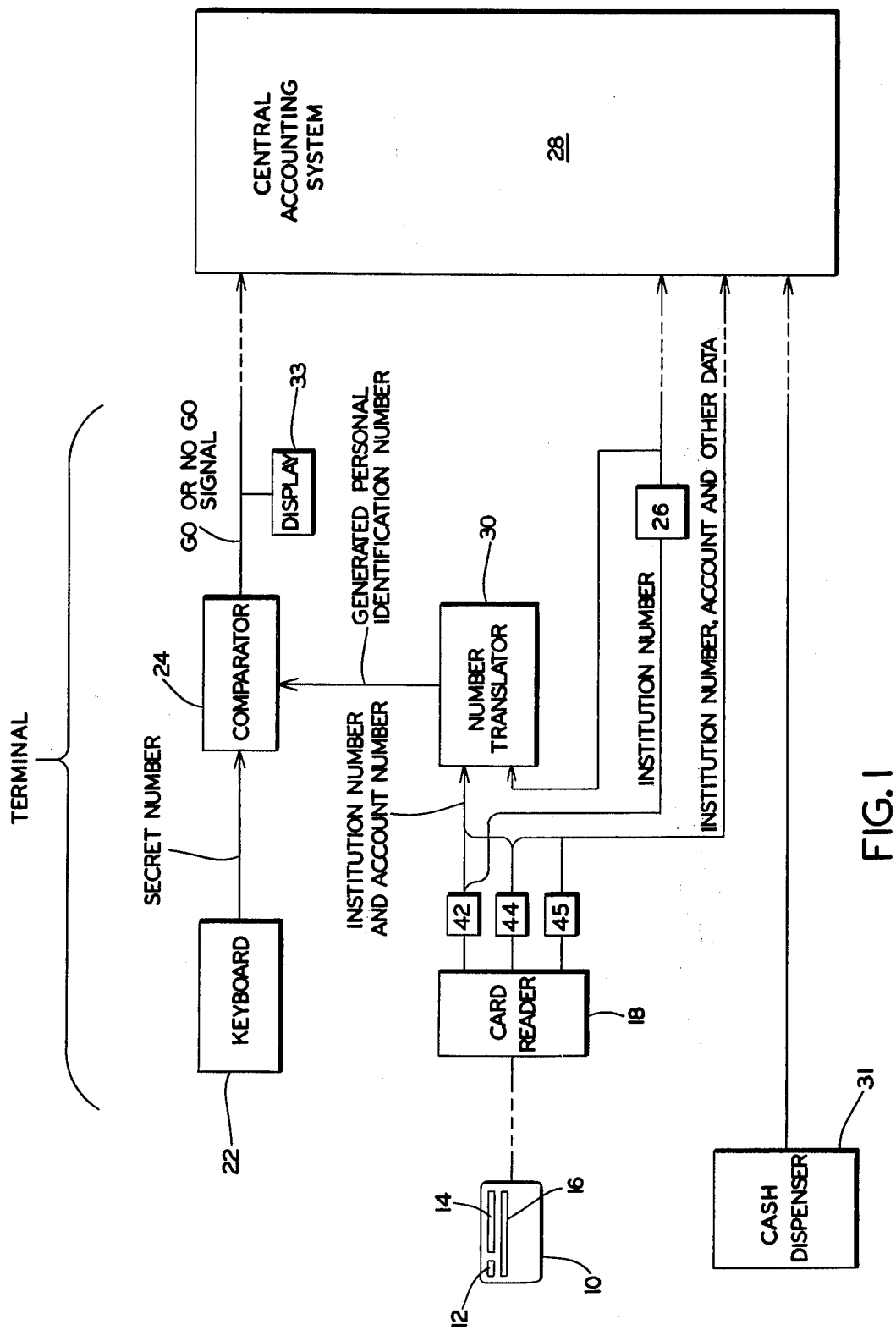
FIG. 1 is a simplified block diagram of the verification system of the present invention.

Referring to FIG. 1, there is shown a simplified block diagram of a verification system according to the present invention. An identification card 10 to be applied to the system has contained thereon fields of data such as fields 12, 14 and 16. Preferably, fields 12, 14 and 16 respectively contain data identifying (1) the institution which issued the card or which holds an account of the authorized card holder, (2) the card account number, and (3) other data e.g. account status and expiration date. Data in fields 12, 14 and 16 are recorded in any suitable form, such as embossed, punched out or electrically conducting regions, although they preferably are bits on a magnetic strip in an appropriate format.

Card reader 18 is a conventional card scanner unit adapted to receive card 10 and convert data recorded on the card into electrical signals in hexadecimal form, with data from fields 12, 14 and 16 being respectively supplied to and stored in shift registers 42, 44 and 45. The data from card reader 18 are applied to number translator 30, institution identification unit 26 and central accounting system 28. Institution identification number and account number data from fields 12 and 14 are supplied to number translator 30 and the data from fields 12, 14 and 16 are supplied to central accounting system 28.

According to the present invention, number translator 30 includes a read only memory which is addressed initially by digits of institution identification field 12 and then, by feeding data back from the output of the memory and logically combining a portion of the feedback data with digits of account number field 14, pseudo-random addressing of the memory is provided and certain of the memory output data provide account number translation. Output data derived from the memory, referred to as the Personal Identification Number (P.I.N.), bear no ascertainable relationship to the card read data.

During verification of card 10, the P.I.N. generated by the number translator 30 is correlated with a secret number M that is entered by the holder of the card through keyboard 22. Digits of the secret number M are correlated on a one-by-one basis with digits of the P.I.N. in comparator 24. Comparator 24 generates a go-no go signal in response to the correlation.

Each of the institutions in a cooperative network of institutions is equipped with the verification system of the present invention, each system having an identical number translator 30. Institution identification unit 26 is a binary register that stores the institution identification data 12 and transfers the data to central accounting system 28 to charge the transaction to the issuing institution. Institution identification data 12 form the first or "key" address of the memory of translator 30 and in addition cause the transaction, if approved, to be charged to the identified institution.

Standard cards 10, issued by the cooperating institutions, are verifiable at the verification system at any of the cooperating institutions in the network. Should a card that has been issued from a noncooperating institution be applied to card reader 18 for verification, the initial addressing of the memory with the institution identification number and subsequent addressing with the account number will cause the memory to generate a P.I.N. which does not correlate to the secret number, even if the account number contained on the card is identical to an account number already in use among the cooperating institutions. In order for a correlatable P.I.N. to be generated from memory, both institution identification number data from field 12 and account number data from field 14 contained on card 10, when applied to translator 30, must provide the anticipated pseudo-random vectoring of the memory to generate the correct P.I.N.

In operation, the customer inserts card 10 into card reader 18 and manually enters his secret number into keyboard 22. Card reader output data are applied to central accounting system 28, institution identification unit 26 and number translator 30. Central accounting system 28 is located at an area accessible to the transacting institution and includes computer storage and data processing equipment of a type that is well known and presently used by banking facilities. Number translator 30 is pseudo-randomly addressed by the institution identification data from field 12 and account number data from field 14 to generate a P.I.N. that is correlated with the secret number data stored in keyboard 22 at comparator 24. Also applied to central accounting system 28 are the data derived from field 16 on card 10 representing, e.g., status of the card holder, card expiration date, and other information. Assuming that the card holder is the authorized holder, as determined by comparator 24, and a requested cash withdrawal transaction is authorized, cash is dispensed from cach dispenser 31 and the transaction is charged to the issuing institution in accordance with the identification data stored in institution identification unit 26. A go or no go signal is displayed to the customer in display unit 33 which may be an alpha numeric or signal lamp type display or the like.

Institution identification data from field 12 are applied by card reader 18 to binary shift register 42 as two hexadecimal digits ($A_1A_2$). Account number data from field 14 are applied to register 44 as a plurality of digits ($Z_1Z_2 \ldots Z_N$), each encoded in hexadecimal. The operation of registers 42 and 44 is described in detail infra. Data from field 16 are applied to register 45 for presentation to central accounting system 28.

Register 26 serves as a supplemental storage register for the institution identification number and supplied the data to central accounting system 28 for charging an approved transaction to the identified institution. Register 26, shown in more detail in FIG. 2, may be loaded at the outset of a verification cycle by a load control signal (LD) described infra. Alternatively, register 26 may be loaded by an interrogation signal generated by central accounting system 28 indicative that a requested transaction has been approved based on the result of a card verification cycle and other data, e.g., account status. The institution identification data loaded in register 26 are then supplied to system 28 for charging the transaction against the identified institution.

Figure 2:
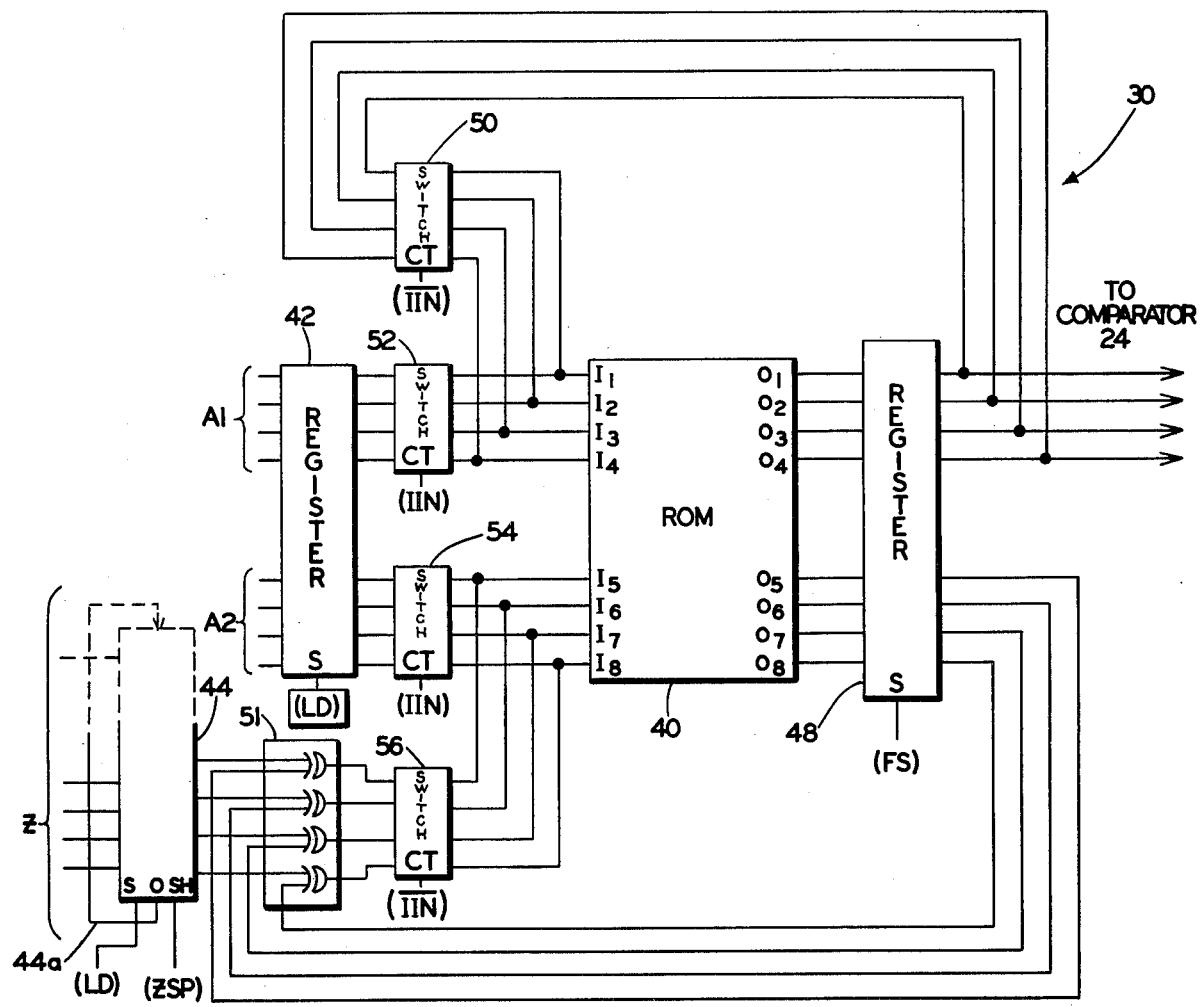
FIG. 2 is a circuit diagram of the number translator and a simplified block diagram of a sequencer of the verification system.
Figure 2:
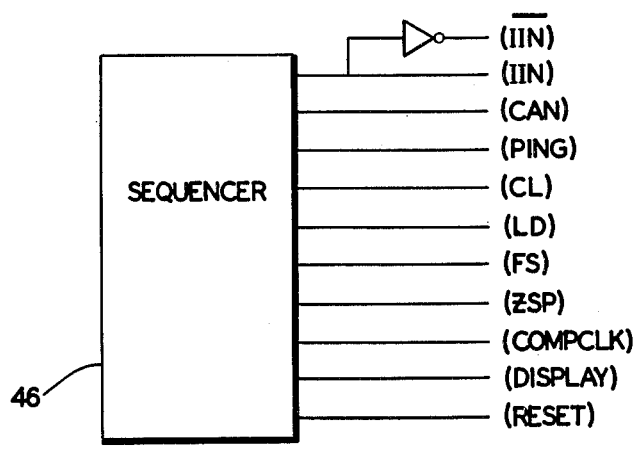

Referring to FIG. 2, number translator 30 comprises read only memory (ROM) 40, sequencer 46, EXCLUSIVE OR circuit 51, controlled switches 50, 52, 54, 56, and registers 42, 44 and 48. Any suitable memory device operable as a read only memory such as semiconductor memory or magnetic core can be used as ROM 40; however, a MOSFET programmable read only memory (ROM) is preferred due to the small size and ease of programming thereof. One such ROM is the Intel 1602A which is programmed to contain 256 bytes having random hexadecimal values between 00 and 255 with no repeat (the number 255 is represented as FF in hexadecimal; hexadecimal numbers are represented in accordance with Table 1–3, p. 13, Minicomputers for Engineers and Scientists, Korn, 1973, McGraw-Hill, Inc.).

ROM 40 is addressed by an address byte including two digits, each having four bits, encoded in hexadecimal. The four bits of the first and second digits are respectively applied to terminals $I_1$–$I_4$ and $I_5$–$I_8$ of ROM 40. Each stored byte of ROM 40 is addressable from address terminals $I_1$–$I_8$; however, there is no ascertainable relationship between the stored bytes and the address bytes.

Switches 50, 52, 54 and 56 are gates with three state totem-pole outputs, such as the SN 74125 gate manufactured by Texas Instruments, Inc. which selectively passes data between input and output terminals thereof depending on the state of control terminals CT; a logic zero signal applied to terminal CT turns a corresponding switch on and a logic one signal turns the switch off. Switches 50, 52, 54 and 56 receive address data from registers 42 and 48 and EXCLUSIVE OR circuit 51 and supply the data to address terminals $I_1$–$I_8$ of ROM 40 in accordance with institution identification number mode signal (IIN) and the complement thereof ($\overline{\text{IIN}}$) supplied by sequencer 46 to terminals CT. Register 42 is controlled by register load signal (LD), register 48 is controlled by feedback strobe signal (FS), register 44 is controlled by load signal (LD) and account digit shift signal (ZSP). All control signals, shown enclosed in parenthesis, are generated by sequencer 46 as described infra.

Registers 42, 44 and 48 respectively temporarily store institution identification number data, account number data, and ROM 40 output data, under control of signals (LD) and (FS). Institution identification number data read from card 10 are bit parallel loaded into register 42 and account number data are bit parallel loaded into register 44. Register 48 serves as a temporary storage means for data outputted from ROM 40 so that previously accessed data are not lost when ROM 40 is re-addressed. Each of registers 42, 44 and 48 includes a: (a) strobe terminal S which, when pulsed, causes the data applied in bit parallel to the inputs of the register to be stored therein, and (b) shift terminals SH which, when pulsed, causes serial shifting of the stored data. A register such as the SN 74199 manufactured by Texas Instruments, Inc. is suitable in this application. The shift terminal SH is used only in register 44.

Translator 30 functions in three modes of operation, namely (a) an institution identification number mode IIN wherein ROM 40 is initially addressed or "keyed" with the institution identification number, (b) a customer account number mode CAN wherein ROM 40 is addressed using the account number, and (3) a personal identification number generating mode PING wherein the digits of the P.I.N. are derived from bytes generated by ROM 40. In the institution identification number mode, an address byte representing institution identification digits $A_1A_2$ is applied to ROM 40 address terminals $I_1$–$I_8$; in the account number mode, ROM output data from output terminals $0_1$–$0_4$ are fed back to address terminals $I_1$–$I_4$ and data from output terminals $0_5$–$0_8$ are fed back and EXCLUSIVE ORed with individual digits $Z_N$ of the account number before being applied to address terminals $I_5$–$I_8$. In the P.I.N. generating mode, the digits of the P.I.N. are generated by ROM 40.

Digits $A_1A_2$ of the institution identification number, stored in register 42, are supplied to address terminals $I_1$–$I_8$ of ROM 40 through switches 52 and 54 which are turned on by the application to terminals CT thereof of control signal (IIN). Signal (IIN), generated by sequencer 46, is at logic zero during the institution identification mode. Corresponding to the address byte formed by digits $A_1A_2$ is a two digit byte in hexadecimal stored in ROM 40 which, when addressed, is asynchronously generated at output terminals $0_1$–$0_8$ of the ROM. The output byte is not stored in register 48 until a first strobe pulse (FS) from sequencer 46 is applied to strobe terminal S of register 48. The first output character from ROM 40, being dependent only on the institution identification number $A_1A_2$ serves as a starting point address or key for pseudo-randomly addressing the ROM. The institution identification number is only once supplied to address terminals $I_1$–$I_8$ of ROM 40 and is thereafter removed by opening switches 52 and 54 with control signal (IIN) which is at logic one when the system is out of the institution identification number mode.

The first four bits of the byte generated by ROM 40 at output terminals $0_1$–$0_4$ are fed back to the input terminals of switch 50 and the second four bits at output terminals $0_5$–$0_8$ are fed back to alternate input terminals of EXCLUSIVE OR circuit 51. Inputs to the other input terminals of EXCLUSIVE OR circuit 51 are provided by register 44 containing a first digit $Z_1$ of the account number. Preferably, the first digit of the account number that is applied to register 44 is the least significant digit of the account number because the encoded account number digits $Z_N$ are disposed in field 14 of card 10 and stored in register 44 according to numerical significance. Randomness of the generated data is partially governed by the order of entry of digits $Z_N$; high randomness occurs when the digits $Z_N$ are entered successively starting with the least significant digit. However, it is to be understood that any digit of the account number could be the first digit applied to the translator 30 during the account number mode; all the digits are applied at least once during a verification cycle.

The digits of the account number, stored in register 44, are advanced one digit (four bits) at a time by the application of serial shift pulses (ZSP) to terminal SH of register 44. Shift pulses (ZSP), generated by sequencer 46, are comprised of pulse trains containing four pulses per train (because each digit stored in register 44 contains four digits). Feedback circuit 44a provides recirculating shift register operation in register 44 whereby data outputted from the register are re-applied to the input thereof. Account number digits serially outputted from register 44 are accordingly serially re-applied to the register and during the account number mode of operation, recirculated digits are used to re-address ROM 40. Since switches 50 and 56 are turned off by control signal ($\overline{IIN}$) from sequencer 46 during the institution number mode, the bytes generated by ROM 40 at output terminals $0_1$–$0_8$ are isolated from address terminals $I_1$–$I_8$ of ROM 40 until initiation of the account number mode.

Under control of sequencer 46, the account number mode is initiated by the generation of logic one account number mode control signal (CAN). In the account number mode, switches 52 and 54 are turned off by logic one signal (IIN) and switches 50 and 56 are turned on by logic zero signal ($\overline{IIN}$). Since institution identification number $A_1A_2$ is not again used to address ROM 40, switches 52 and 54 remain off for the remainder of the verification cycle.

Switches 50 and 56 being turned on and switches 52 and 54 being turned off in the account number mode, the output byte from ROM 40, stored in register 48, is supplied to address terminals $I_1$–$I_8$ of ROM 40; the first output digit at terminals $0_1$–$0_4$ of ROM 40 is supplied directly to address terminals $I_1$–$I_4$ through switch 50 and the second output digit at terminals $0_5$–$0_8$ is EXCLUSIVE ORed with digit $Z_1$ of the account number stored in register 44 and the result applied to address terminals $I_5$–$I_8$. Immediately upon application of the new address byte to address terminals $I_1$–$I_8$ of ROM 40, a new output byte is generated at terminals $0_1$–$0_8$ in accordance with the programming of ROM 40. When a second feedback strobe signal (FS) from sequencer 46 is applied to strobe terminal S of register 48, the new ROM 40 output byte is stored in register 48 to replace the byte previously stored therein. The two digit byte now stored in register 48 is applied back to address terminals $I_1$–$I_8$ of ROM 40, the second digit generated at terminals $0_5$–$0_8$ of ROM 40 being first EXCLUSIVE ORed with digit $Z_1$ of the account number in EXCLUSIVE OR circuit 51. Under the control of sequencer 46, the described addressing cycle is successively repeated by successively applying feedback strobe pulses (FS) to terminal S of register 48 an arbitrary number of times, preferably seven. The number seven is preferred because it is conveniently generated by a commercially available eight stage shift register 84 described infra; however, any integer can be used.

It is apparent that as a result of the successive addressing of ROM 40 with output data thereof, pseudorandom addressing of ROM 40 is provided whereby ROm 40 is pseudo-randomly vectored to provide a series of pseudo-random output bytes.

The above described operating sequence is illustrated in Table 1 at the end of the specification, the programming of ROM 40, the institution identification number $A_1A_2$ and least significant account number digit $Z_1$ applied therein being exemplary. Eight sequence steps, rather than seven, appear in Table 1 because the initial or key address, using the institution identification number (10011000 by way of example), is included.

In the example of Table 1, after seven consecutive cycles of addressing ROM 40 whereby seven randomly stored bytes are pseudo-randomly accessed to generate the byte 10111000, under control of sequencer 46 the next least significant digit $Z_2$ of the account number stored in register 44 is shifted to the last four stages of register 44 with shift pulses (ZSP). Digit $Z_2$ of the account number is applied to pseudo-randomly address ROM 40 in the same manner as described above with respect to digit $Z_1$.

Seven cycles of feedback addressing are repeated under control of feedback strobe signal (FS) for each of the remaining digits $Z_3 \ldots Z_{10}$ of the account number. It is apparent that with a customer account number of ten digits, for example, ROM 40 is accessed 71 times (recalling that ROM 40 was addressed one time using the institution identification number in the IIN mode). It is noted that at this time, the bytes generated by ROM 40 have been used only to provide pseudo-random vectoring of random data stored in ROM 40. None of the output data has yet been used for correlation with the secret number.

After all the digits $Z_1$–$Z_{10}$ of the account number have been used to generate pseudo-random addresses for ROM 40, the four least significant digits $Z_1$–$Z_4$, having been recirculated in register 44 by means of line 44a, are again one-by-one applied to pseudo-randomly address ROM 40 under control of feedback strobe signal (FS). The least significant digit $Z_1$ is used to address ROM 40 seven times and the first digit of the byte generated from ROM 40 at output terminals $0_1$–$0_4$ represents the first digit of the P.I.N. Sequencer 46 now generates P.I.N. generating mode control signal (PING) which inhibits the application of feedback strobe signal (FS) to register 48 causing the stored P.I.N. data to remain stored therein during correlation with corresponding digit $M_1$ of the secret number in comparator 24. Following a comparison cycle, sequencer 46 generating a logic one signal (CAN), causes translator 30 to again operate in the account mode, addressing ROM 40 with digit $Z_2$ for generating the second digit of the P.I.N. The generation of the mode control signals is described in detail with regard to sequencer 46 infra.

Digits $Z_2$, $Z_3$ and $Z_4$ of the account number are individually used to pseudo-randomly address ROM 40, each digit addressing ROM 40 seven times in the account mode and comparing the second, third and fourth digits of the P.I.N., generated at ROM output terminals $0_1$–$0_4$, respectively, with the second, third and fourth digits of the secret number in the P.I.N. generating mode. The four bits of each P.I.N. digit generated by ROM 40 at output terminals $0_5$–$0_8$ are not used for correlation with the secret number and are ignored. The above operating sequence whereby a most significant digit of the P.I.N. having exemplary numerical value 0101 is generated is illustrated in Table 2 at the end of the specification. The seven step sequence extends between sequence numbers 113 and 119 as seen also in Table 4 at the end of the specification, discussed infra. This sequence is preceded by a load sequence (one step), an IIN mode sequence (one step), ten CAN sequences (seventy steps) and ten shift sequences (forty steps). These steps are set forth in Table 4.

Figure 3:
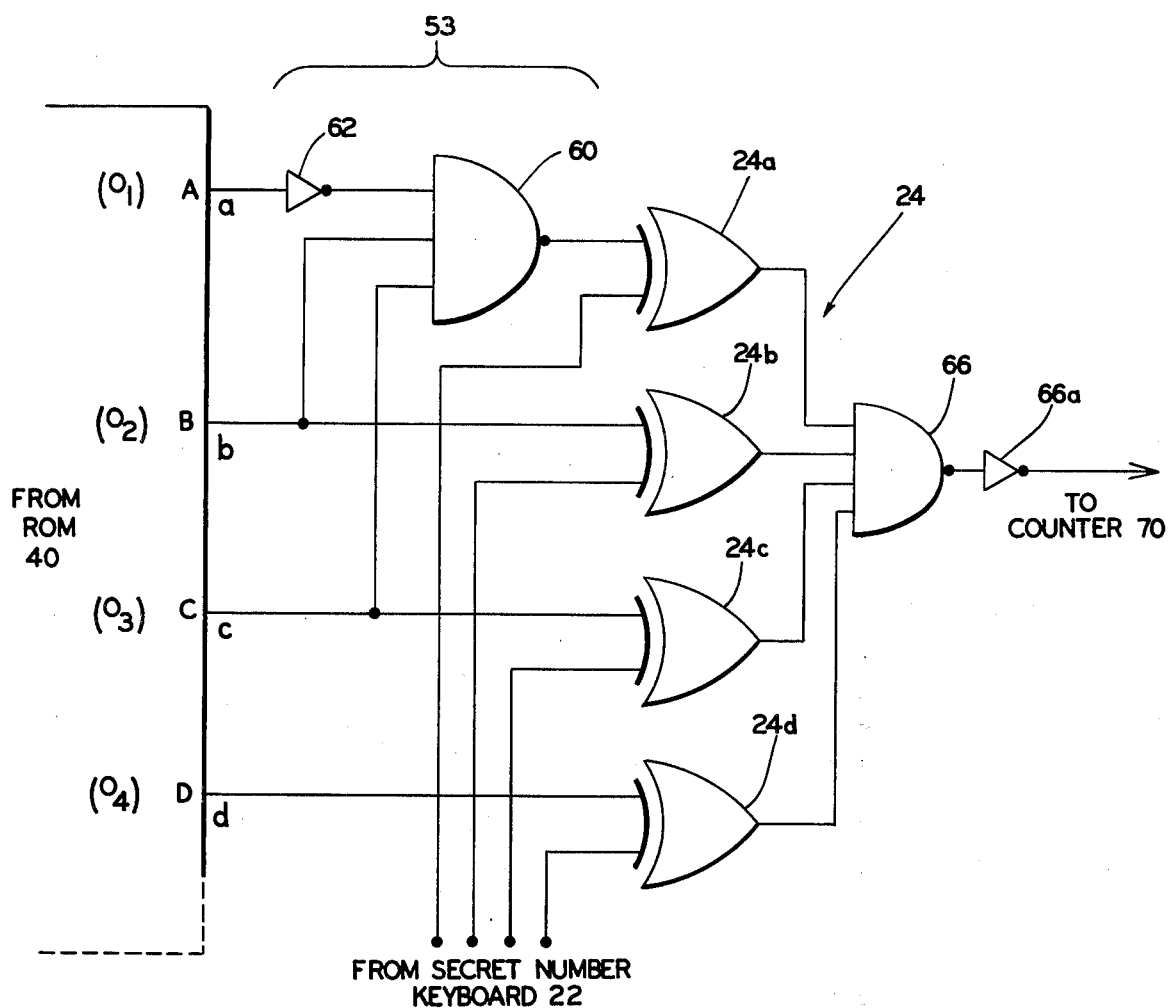
FIG. 3 is a circuit diagram a hexadecimal-to-BCD converter and a digital comparator for comparing digits of the P.I.N. to corresponding digits of the secret number.

The digits generated by ROM 40 are hexadecimal while the digits of the secret number generated by keyboard 18 are binary coded decimal (BCD). Accordingly, before correlation in comparator 24, a hexadecimal-to-BCD conversion must be provided to the digits generated by ROM 40. Referring to FIG. 3, hexadecimal-to-BCD converter circuit 53 receives digits from output terminals $0_1$–$0_4$ of ROM 40 in hexadecimal and converts the digits to BCD.

In converter 53 hexadecimal-to-BCD conversion is provided by digitally determining whether the value of hexadecimal digit from output terminals $0_1$–$0_4$ of ROM is less than six (0110) and if so, adding eight (1000)

thereto. If the digit is of value greater than or equal to six, the digit is used directly.

Table 3 shows the result of the hexadecimal-to-BCD conversion using the above conversion algorithm. If the resultant digits are complemented as shown in the column headed "BCD". It is noted that the decimal numerals 2–7 appear twice in the mapping of hexadecimal digits 0–15 to decimal digits 0–9. Accordingly, the occurrence of the numerals 0, 1, 8 and 9 occur less frequently than do the remaining numerals 2–7. This lack of uniformity of spectral density caused by the nonuniform mapping does not render the transformation between card recorded information and secret number substantially more predictable. In FIG. 3, leads a, b, c, and d of the circuit illustrated each receives, in bit parallel, one bit of the four bit hexadecimal digit generated by ROM 40 at ouput terminals $0_1$–$0_4$. Conversion to BCD is provided by gate 60 and inverter 62 which intervene between the output of register 48 (FIG. 2) and the input of comparator 24. Comparator 24 comprises four EXCLUSIVE OR gates 24a, 24b, 24c and 24d which compare each four bit digit of the P.I.N. generated at output terminals $0_1$–$0_4$ of ROM 40 with each four bit digit of the keyboard entered secret number M, and gates 66 and 66a.

Figure 4:
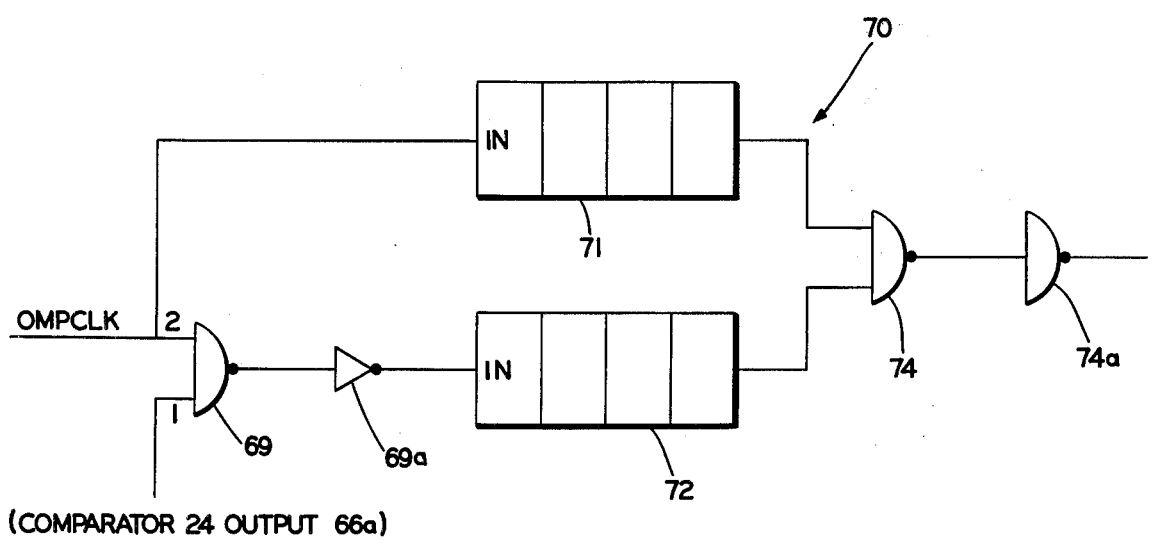
FIG. 4 is a circuit diagram of the counter of the verification system for generating a go-no go signal responsive to the comparator.

Any hexadecimal digit applied to leads a, b, c, d, having a value less than six (0110), has added thereto by gate 60 the numeral eight binary digit (1000) while digits having a value greater than or equal to six (0110) are applied to comparator 24 without adding the digit 1000 thereto. In the example of Table 2, the digit 0101 generated at terminals $0_1$–$0_4$ of ROM 40 is applied to converter 53 input terminals a, b, c, d. Inverter 62 and gate 60 convert the digit 0101 to the digit 1101 before application to comparator 24. The digit 1101 is the binary complement of the BCD digit 0010 which corresponds to the hexadecimal digit 0101 as shown in Table 3. The complemented BCD digit mentioned above is applied to comparator 24 for correlation with an uncomplemented digit of the secret number. Since each stage of comparator 24 is actually an exclusive-OR gate, each stage generates a logic one signal whenever the input signals applied thereto are opposite, i.e., a logic one and a logic zero. For this reason, the digits of the secret number from keyboard 22 are supplied directly to comparator 24; they are not complemented. In the present example, comparator 24 generates a logic one signal for the keyboard generated digit 0010. Counter circuit 70, shown in FIG. 4, is responsive to logic one signals generated by binary inverter 66a.

Counter circuit 70 comprises a pair of four bit, serial in/serial out shift registers 71 and 72 such as the SN 7493 manufactured by Texas Instruments, Inc. The output terminal of gate 69, after inversion in binary inverter 69a, is connected to input terminal IN of shift register 72. Input terminal 2 of gate 69 receives comparator clock signal (COMPCLK) generated by sequencer 46. The (COMPCLK) signal is generated during the P.I.N. generating mode and is derived from feedback strobe signal (FS). One pulse of the (COMPCLK) signal is generated for every seven feedback strobe pulses of signal (FS) as described in detail in the description of sequencer 46 infra. During the P.I.N. generating mode, signal (FS) is inhibited from being applied to register 48 and one pulse of the (COMPCLK) signal is serially loaded into register 71 during the generation of each digit of the P.I.N. Each time a logic one (COMPCLK) signal is applied to input terminal 2 of gate 69, the logic one signal is also serially loaded into the first stage of shift register 71. If, coincident with the generation of a logic one (COMPCLK) signal from sequencer 46, a positive comparison in comparator 24 between a secret number digit and ROM 40 generated P.I.N. digit exists, a logic one signal is also applied to input terminal 1 of gate 69. Responsive thereto, the output terminal of NAND gate 69 changes to a logic zero and, by signal inversion in binary inverter 69a, a logic one signal is serially loaded into register 72. Each logic one signal loaded into shift register 71 is indicative of the occurrence of one P.I.N. generating cycle; each logic one signal loaded into shift register 72 is indicative of a favorable comparison between a digit of the generated P.I.N. and a corresponding digit of the secret number M stored in keyboard 22. Following the generation of four digits to the P.I.N. whereby four pulses of the (COMPCLK) signal are serially loaded into four stage shift register 71, a logic one signal is generated at the output thereof. If and only if all four comparisons are positive, indicating that the four digits of the ROM 40 generated P.I.N. are identical to the four digits of the secret number, a logic zero "go" signal is generated at the output terminal of NAND gate 74. If desired, the signal can be inverted by binary inverter 74a.

It is understood that registers 71 and 72 each contains exactly one stage for each digit of the secret number and that while a four digit secret number is shown in the preferred embodiment, any number of digits can be used.

Sequencer 46 provides clocking and sequence control signals to verification system 30. Signals enclosed in parenthesis identify sequencer 46 generated signals. The sequence control signals comprise mode control signals (IIN), (CAN) and (PING) indicating respectively, institution identification number, customer account number and P.I.N. generating modes of operation; logic one register load signal (LD) for controlling the storage of data read by card reader 18 into registers 42 and 44, logic one feedback strobe (FS) for controlling the storage of ROM 40 output data in register 48 during pseudo-random addressing of the ROM, logic one comparator clock signal (COMPCLK) for counting the number of P.I.N. digits geneated by ROM 40, and logic one shift pulses (ZSP) for serially shifting account number digits $Z_N$ in register 44. Sequencer 46 also generates clock signal (CL) which is the basic timing signal of the system. Clock signal (CL) is generated in sequencer 46 by a standard free running multivibrator; all sequencing of operations in system 30 are synchronized to clock signal (CL). (RESET) and (DISPLAY) signals control the named functions in the system.

Sequence controllers are well known in the art and may take on many forms including read only storage controls, counter decoder controls and the like. For example, read only storage could be used to generate the necesary control signals for loading registers 42 and 44, controlling switches 50, 52, 54 and 56, strobing register 48, interrogating comparator 24 and shifting digits in register 44 according to a programmed sequence. The complete operating sequence of sequencer 46 is shown for a ten digit account number in Table 4 at the end of the specification.

Figure 5A:
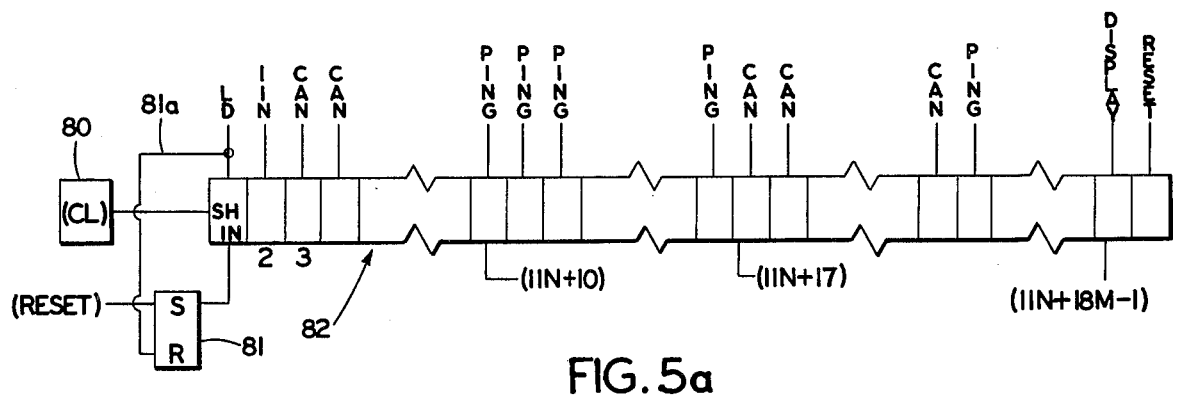
FIGS. 5(a) to 5(c) are circuit diagrams of portions of the sequencer of the verification system.
Figure 5B:
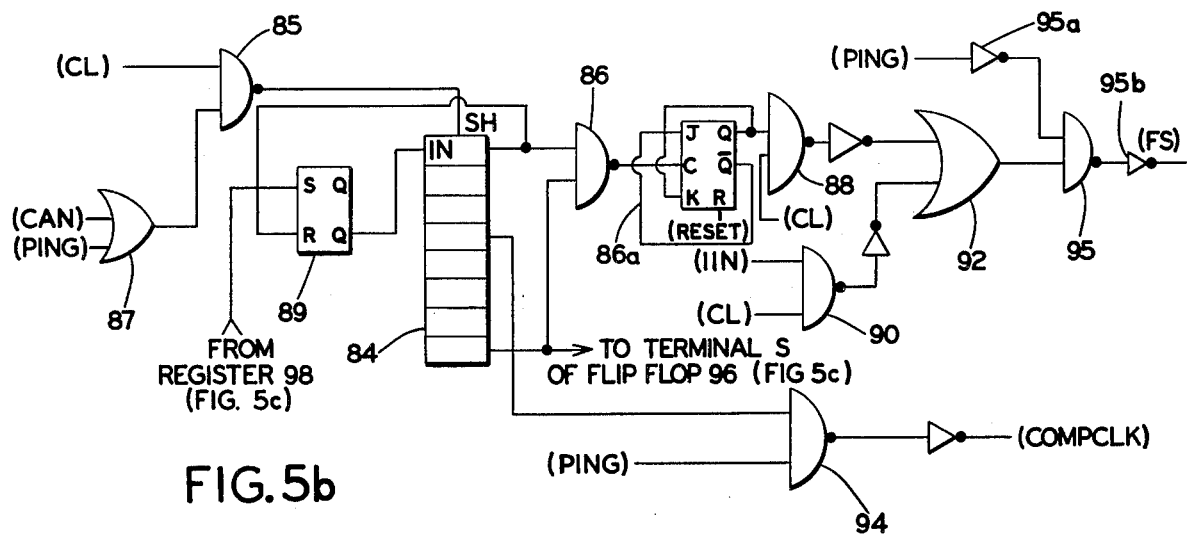
Figure 5C:
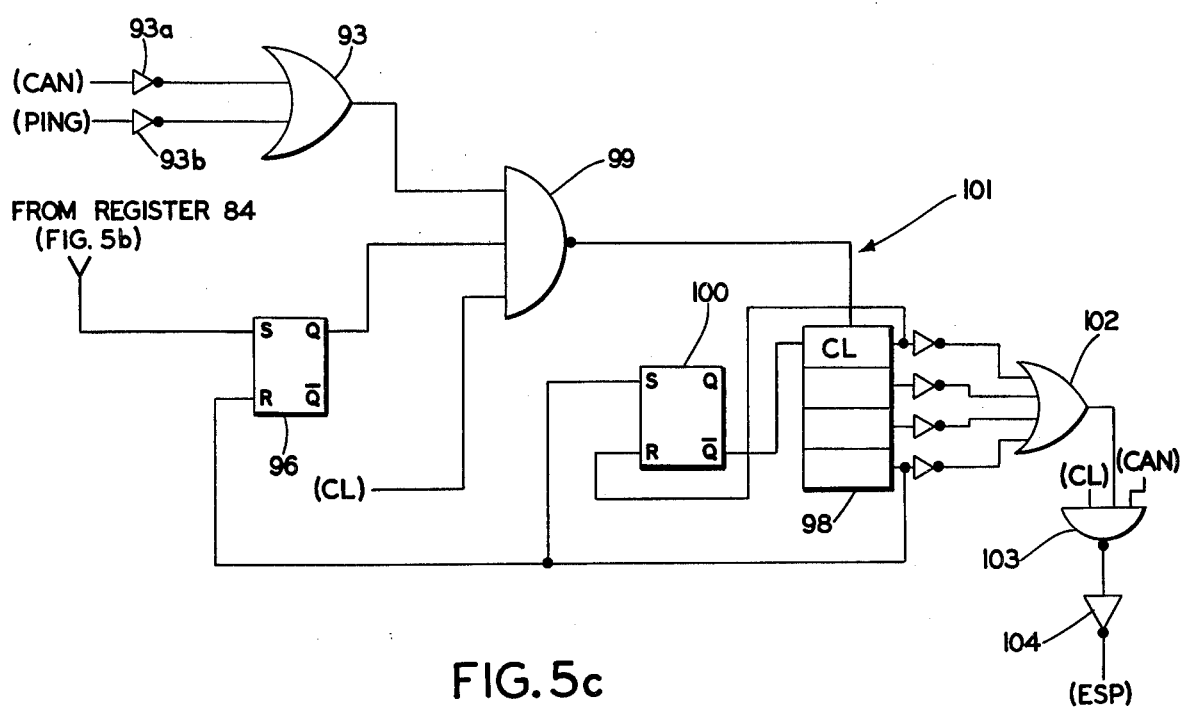

FIGS. 5A–5C are a logic diagram of one embodiment of sequencer 46. Shift register 82 shown in FIG. 5A generates register load signal (LD), mode control signals (IIN), (CAN), and (PING), display signal (DISPLAY) to display the go or no-go signal following the verification cycle, and reset signal (RESET). FIGS. 5B and 5C disclose logic circuitry for deriving control signals (FS), (COMPCLK) and (ZSP) from the signals generated by shift register 82.

In FIG. 5A, clock source 80, the basic timing source of the system, generates clock pulses (CL) to shift terminal CL of register 82. Set-reset flip-flop 81 is initially set to provide a logic one signal output in response to a (RESET) signal. (RESET) was supplied at the end of a previous verification cycle. The flip-flop 81 supplies the logic one signal to input terminal IN of the first stage of register 82. The output of flip-flop 81 is then reset to a logic zero signal during the second clock pulse (CL), generated by clock pulse generator 80, by means of feedback circuit 81a connected between the output of the first stage of register 82 and the flip-flop 81 reset terminal R. As clock source 80 generates additional pulses to shift terminal SH of register 82, a single logic one bit is serially advanced stage by stage from left to right in the register 82 as shown in FIG. 5A. The first stage of register 82 provides load signal (LD) that is supplied to registers 42 and 44. The remaining stages provide mode control signals (IIN), (CAN), (PING) that are supplied to translator 30. Commonly labeled output terminals, e.g., CAN, are connected together through logic OR circuitry (not shown). The logic OR circuitry is preferably of the hard-wired type to reduce the amount of circuit hardware required.

Generalizing, it is seen that the second stage of register 82 generates one pulse of mode control signal (IIN) and pulses of mode control signal (CAN) are generated from register 82 at stages 3, 4, 5 . . . (11N + 9), where N is the number of digits in the account number. In Table 4, where a ten digit account number of used, by way of example, the (CAN) control signal is generated from stages 3–119 of register 82. Mode control signal (PING) is generated by register 82 after all account number digits $Z_1$–$Z_N$ have been applied to pseudo-randomly address ROM 40 and the least significant digit $Z_1$ has, for a second time, been applied to pseudo-randomly address ROM 40 (at stage 120 of register 82 in Table 4). P.I.N. generating mode control signal (PING) inhibits the application of feedback strobe signals to register 48 at which time each ROM 40 generated digit of the P.I.N. is compared with corresponding digits of the secret number in comparator 24. Mode control signal (PING) is generated by register 82 following the second application of the digits of the account number which are recirculated in register 44 to pseudo-randomly address ROM 40.

In sequence, (PING) is generated by memory register 82 from stages (11N + 10) . . . (11N + 16). When the bit in register 82 shifts to stage (11N + 9) (stage 119 when $N = 10$), the first digit of the generated P.I.N. is stored in register 48. Control signal (PING) is applied to prevent register 48 from being strobed by feedback strobe signal (FS) until after the stored digit has been compared to the corresponding keyboard entered secret number digit. The (CAN) mode control signal is again generated by register 82 at stage (11N + 17) and ROM 40 is pseudo-randomly addressed using the next least significant digit $Z_2$ of the account number.

Account number digit $Z_2$ is shifted into position in register 44 for addressing ROM 40 by the generation of shift pulses (ZSP) from the circuit of FIG. 5(c). When the bit stored in register 82 is shifted to stage (11N + 27) (stage 137 where $N = 10$ as in Table 4), the second digit of the ROM 40 generated P.I.N. is stored in register 48 and the (PING) signal is applied to inhibit the application of feedback strobe pulses to register 48 during comparison of the stored digit with the corresponding digit of an m digit secret number M. Generation alternately of mode control signals (PING) and (CAN), corresponding respectively to the generation and comparison of the third and fourth P.I.N. digits with third and fourth digits of the secret number M, is illustrated in Table 4 for a ten digit account number and a four digit secret number (N=10, m=4). Following the vertification cycle at stage (11N + 18m−1) of register 82 (stage 181 in Table 4), display signal (DISPLAY) is generated by memory register 82 to display the go or no-go result of the verification. Control signal (DISPLAY) is supplied to display unit 33 in FIG. 1.

In the preferred embodiment, signals (LD), (IIN), (CAN), (PING), (DISPLAY) and (RESET) are supplied by shift register 82; the remaining signals are derived from the register 82 supplied signals by means of logic circuitry.

FIG. 5b is a logic diagram of a circuit for generating, responsive to the signals generated by shift register 82, the signals (FS) and (COMPCLK). Feedback strobe signal (FS) is applied to control register 48; comparator clock signal (COMPCLK) is applied to counter circuits 71 and 72 each time a positive comparison has been made between a digit of the P.I.N. and a corresponding digit of the secret number M in the P.I.N. generating mode.

Feedback strobe signal (FS) comprises a group of pulse trains, preferably seven pulses per train, which is generated during the account number mode of operation responsive to mode control signal (CAN). In addition, a single strobe pulse (FS) is applied during the institution identification number mode of operation wherein ROM 40 is initially addressed with the institution identification number data.

Eight stage serial shift register 84 is controlled by shift pulses generated by NAND gate 85 and OR gate 87. The parallel outputs of the stages of the register are normally at a logic one. Shift pulses are applied to shift terminal SH of register 84 during the account number and P.I.N. generating modes of operation. The Q output of set-reset flip-flop 89, connected to input terminal IN of register 84, loads a single logic zero signal into the first stage of the shift register. Thereafter the flip-flop 89 is automatically reset by means of feedback circuit 89a connected to reset terminal R. Gate 86, connected to the first and eighth stages of register 84, provides a logic one signal to flip-flop 88a when the logic zero signal, stored in register 84, is located at the first or eighth stages therof. The J-K flip-flop 86a is operated as a toggle flip-flop and supplies a logic one signal to one input of gate 88 while the logic zero in register 84 is in stages two through eight. The clock signal (CL) from clock signal generator 80 is supplied to the other input of gate 88. During the CAN and PING modes, responsive to clock signal (CL) and flip-flop 86a, gate 88 generates pulse trains synchronized to clock generator 80, each train containing seven pulses. Gate 90 causes a pulse to be added to the train of pulses during only the IIN mode of operation. OR gate 92 generates a pulse train which includes both the pulse train generated by gate 88 and the single pulse during the IIN mode supplied by gate 90. (PING), applied through binary inverter 95a to NAND gate 95, inhibits feedback strobe signal (FS) during the PING mode of operation. During the PING mode, P.I.N. digits, stored in register 48, are compared with digits of the keyboard entered secret number M.

The (COMPCLK) signal, which is applied to strobe counter 70 once during each seven address cycles of ROM 40 in the P.I.N. generating mode of operation, if derived by logically NANDing the output signal of one stage of register 84 with mode control signal (PING) in gate 94. NAND gate 94 is shown connected to the output terminal of the fourth stage of register 84 but it is understood that gate 94 could be connected to any of stages 2–8 thereof. An output signal is derived from the last stage of register 84. This output signal is used for synchronizing generation of the account number shift pulses (ZSP) as shown in FIG. 5(c).

Referring to FIG. 5(c), (ZSP) pulses are generated by sequencer 46 and are applied to shift register 44 in FIG. 2 during the CAN mode of operation. (ZSP) pulses comprise trains of four pulses which are initiated following each set of seven pseudo-random addresses generated by ROM 40. Each train of pulses (ZSP) is supplied to shift terminal SH of shift register 44 to cause a four stage advance of bits stored in the register, i.e., one digit. NAND gate 99 is responsive to (CL) (generated by clock generator 80), flip-flop 96 and (CAN). During the CAN mode of operation, a logic one signal is supplied to one input terminal of NAND gate 99. When a logic zero signal is generated by the last stage of register 84, flip-flop 96 supplies a logic one signal to gate 99. Under the described condition, NAND gate 99 supplies clock pulses (CL) to shift terminal SH of four stage serial shift register 98.

The output terminals of the stages of register 98 are normally at a logic one. The $\overline{Q}$ output of flip-flop 100 loads only the first stage of shift register 98 with a logic zero signal; the $\overline{Q}$ output of flip-flop 100 is thereafter reset to a logic one signal by means of feedback circuit 100a. Signals supplied to shift terminal SH by NAND gate 99 serially advance the logic zero signal in shift register 98.

The output signals from each stage of register 98, after inversion in binary inverters 98a, are applied to OR gate 102. The output of OR gate 102 is logically NANDed with (CL) in gate 103. Binary inverter 103a, responsive to gate 103, generates pulse trains containing four pulses per train comprising (ZSP). The output of the last stage of register 98 is returned to the set terminals S of flip-flop 100, to the set terminal S of flip-flop 89 and to the reset terminal R of flip-flop 96 to ready the (ZSP) generating circuit for another cycle of operation.

All of the components of the present system are conventional and are preferably formed of TTL logic. It is to be understood that the system could be constructed of other types of logic families such as DTL, RTL or MOS logic, although TTL is preferred in view of the relatively high speed and high noise immunity characteristic of the TTL family. CMOS type circuitry could also be used if desired, especially where high noise immunity is required.

One important aspect of the present invention is that the institution identification number, besides being a key or starting point for pseudo-randomly addressing ROM 40, also provides a means for charging a transaction to the institution issuing the card or holding the identified account. Where institutions are part of an interchange network wherein a customer having an account at one institution is permitted to transact at a cooperating institution, the present invention provides for such a transaction while preventing comingling of accounting. At each cooperating institution, the verification system responds to the institution identification number located on field 12 of card 10 and transfers a signal representative of the institution identification number to a central accounting network to inform the network that the present transaction is to be charged to the institution having the identification number. Because cooperating institutions have identical read only memories (ROM 40), a standard card is verifiable at all cooperating institutions, the transaction being charged only to the identified institution. Thus, a banking customer may make a withdrawal from his savings account at bank B from an unattended terminal at bank A, or a vendee can make a credit purchase against a credit account with credit institution C at a point of sale terminal which accepts credit from credit institution C and others.

As an example, assume a customer carries a card bearing an account number 0123456789 and an institution identification number 12 which, when applied to the vertification terminal of the issuing institution generates a P.I.N. of 1234 (in hexadecimal). The card, when presented at another institution having the identification number 15 also generates the P.I.N. 1234 (in hexadecimal) since the memories are identically programmed at the two institutions and the system responds only to the card contained data. However, the system at institution 15, responding to the institution identification number on field 12 of the card, besides verifying that the holder of the card is the authorized holder, charges the transaction to the account 0123456789 at the institution having identification number 12. The transaction is not charged to an account having an identical number held by institution 15. Contra, a card bearing an institution identification number of a noncooperating institution when applied to the verification system of the present invention generates a P.I.N. which is not correlatable with the predetermined secret number, even if the account number is identical to that of the previous example because the noncooperating institution number generates a different starting point address or key to ROM 40 from that of the previous example. Therefore, identical account numbers can simultaneously be active as different institutions but because the institution identification number of each institution is unique, unique P.I.N.s are generated from the data contained on the card and the transaction is charged only to the identified institution.

If the standard card is applied to the verification system of a noncooperating institution, an uncorrelatable P.I.N. is generated because verifications systems of noncooperating insitutions contain read only memories (ROM 40) which are programmed differently from those of the cooperating institutions. Of course, the noncooperating institution can cooperate in another system of cooperating institutions which are provided with verification systems of the present invention having identically programmed ROM 40s.

Where the secret number supplied to the customer is the pseudo-randomly generated P.I.N. derived from the institution identification and account numbers in number translator 30, the secret number, keyboard entered by the customer, is directly compared to the P.I.N. generated by ROM 40 during a verification cycle. It is advantageous, as an aid to a customer's memory, to permit the customer to select a secret number which he can easily remember and then to convert the selected number to a correlatable number during vertification. If the secret number is selected by the customer at the time of issue of a card, an offset number is added to the customer selected P.I.N. to form the resulting P.I.N. which compares positively to the ROM 40 generated P.I.N. The relationship for card verification is described by the following equation:

$$(CSPIN)_{10} - (OFFSET)_{10} = (GPIN)_{10} \text{ (without carry)}$$

where CSPIN is the customer selected personal identification number, OFFSET is a conversion or offset number and GPIN is the ROM 40 generated P.I.N.

Offset number OFFSET is contained on card 10 preferably in field 14 and is developed at the time of issue of the card from the following equation:

$$(OFFSET)_{10} = (GPIN)_{10} - (CSPIN)_{10} \text{ (without borrowing)}$$

In order to avoid an occurrence of negative $(OFFSET)_{10}$ digits, prior to subtraction, the number "ten" is added individually to each digit of $(GPIN)_{10}$ that is less than the corresponding digit of $(CSPIN)_{10}$.

During verification, the P.I.N., derived from the customer's selected secret number and OFFSET number, can be generated by a decimal adder circuit without carry. Another means for adding the secret number and OFFSET number in decimal without carry is to provide a read only memory which is programmed to generate characters which represent the decimal sum without carry of each digit of the secret number and offset number.

Figure 6:
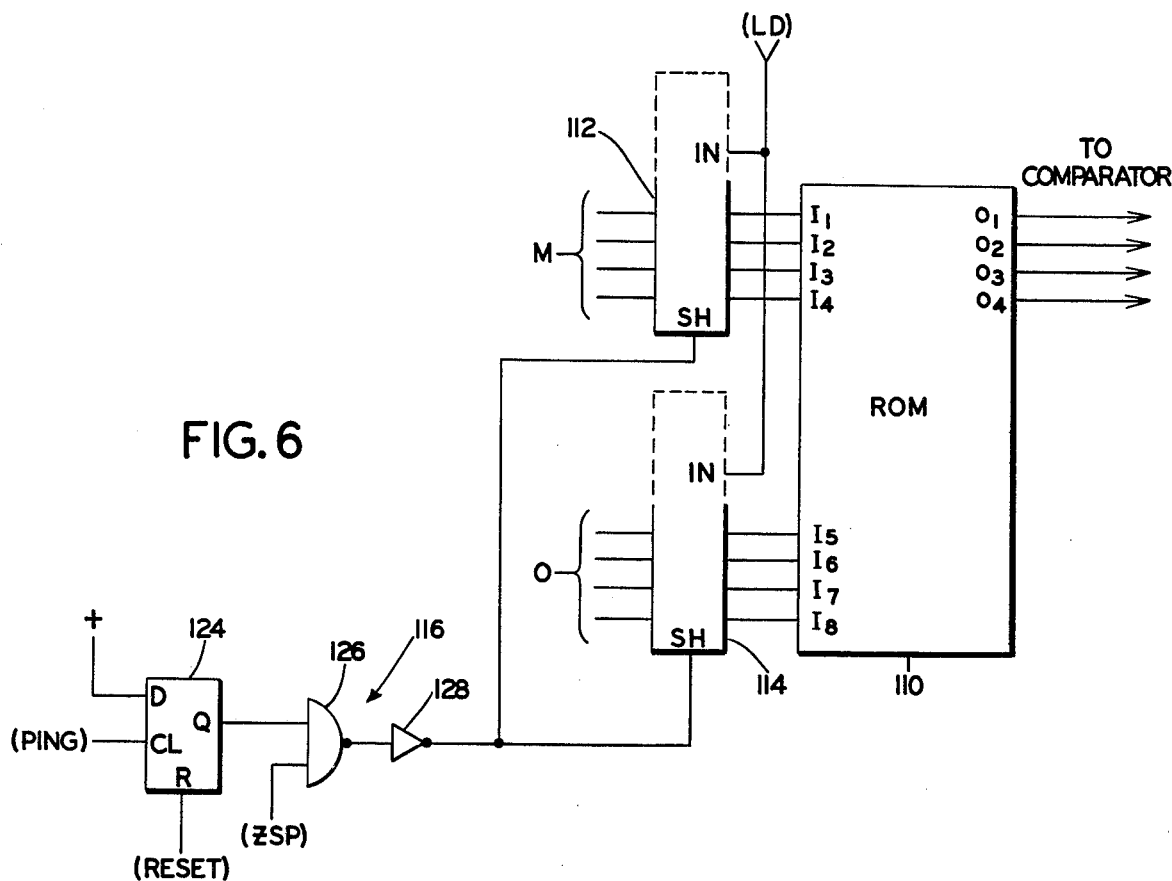
FIG. 6 is a circuit diaram of optional apparatus of the invention for converting a customer selected secret number to a P.I.N.

In FIG. 6, ROM 110 is programmed to generate, at terminals $0_1$–$0_4$ thereof, the decimal sum without carry, of two four-bit digits, i.e., secret number digit and OFFSET digit, applied to address terminals $I_1$–$I_4$ and $I_5$–$I_8$ thereof. Register 112 stores the digits of secret number M keyboard entered by the customer and register 114 stores the digits of offset number OFFSET read from card 10 by card reader 18. These registers are parallel loaded with signal (LD). Where the secret number is a four digit number $M_1M_2M_3M_4$, registers 112 and 114 contain 16 stages each.

After the first (PING) signal has occurred, shift circuit 116 allows data in registers 112 and 114 to be serially shifted simultaneously with register 44. This insures that the offset number and secret number will be synchronized with the proper GPIN for comparsion.

Shift circuit 116 comprises D-type flip-flop 124, NAND gate 126, and inverter 128. Flip-flop 124, responsive to the first (PING) after reset, records the fact that the PING-CAN sequence has been entered, and thus supplies a logic one to one input of NAND 126. ZSP is supplied to the other input terminal of NAND 126. NAND 126, through inverter 128, supplies the required shift pulses to terminals SH of registers 112 and 114, for the remainder of the PING-CAN sequence. Reset will shut off these pulses for the initial CAN sequence.

Figure 7:
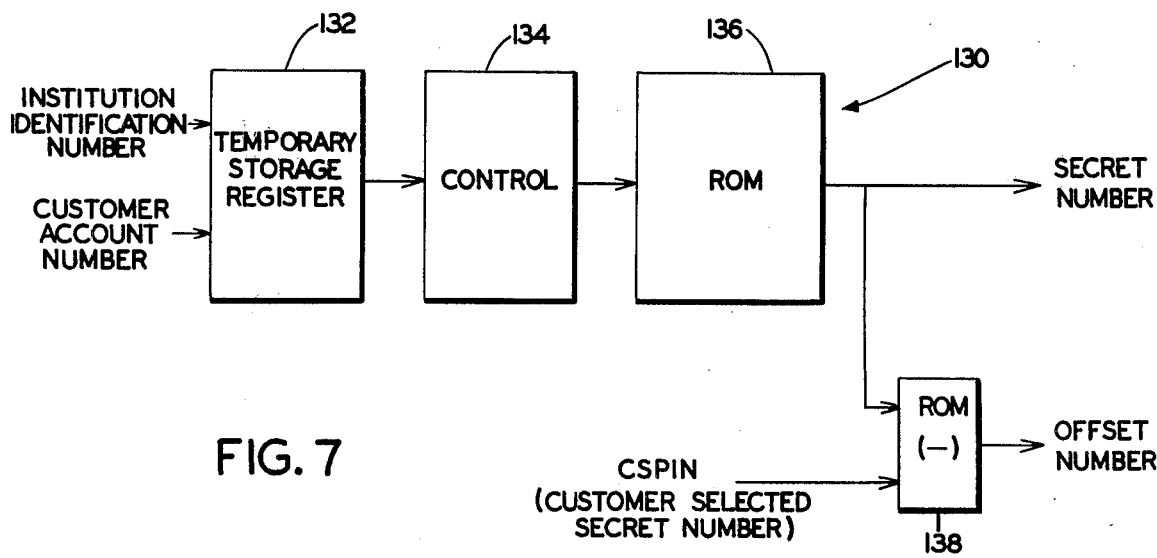
FIG. 7 is a block diagram of an apparatus for generating a secret number from data contained on a card when the card is issued.

FIG. 7 is a simplified block diagram of apparatus for generating a secret number to a customer at the time of issue of the card. Secret number generator 130 comprises register 132 for temporarily storing institution identification number data and customer account number data, control circuitry 134, first read only memory 136 and second read only memory 138. Register 132 is identical to registers 42 and 44 in FIG. 2, control 134 is identical to switches 50, 52, 54, 56 and EXCLUSIVE OR circuit 51, and ROM 136 is identical to ROM 40.

ROM 138 is the inverse of ROM 110 in FIG. 6, i.e., it is programmed to generate the difference between the individual digits of CSPIN and GPIN in base 10 to provide the OFFSET. In order to avoid an occurrence of negative $(OFFSET)_{10}$ digits, prior to subtraction the number ten is added individually to each digit of $(CSPIN)_{10}$. Again, if desired, ROM 138 can be a decimal subtractor circuit. However, a ROM is preferred because it is readily available and is identical to ROM 138 and ROM 40. A sequencer (not shown) such as sequencer 46 of FIG. 2 provides timing and control signals to generator 130. Responsive to an institution identification number and customer account number, applied to register 132, secret number generator 130 outputs a secret number to an alphanumeric display or printer to inform the customer of his secret number. This operation was described in detail with respect to FIG. 2.

In vertification system 30 of FIG. 2, the P.I.N. was applied to comparator 24 for comparison with the secret number. If a customer selected P.I.N. (CSPIN) is not used, the customer commits the GPIN to memory; where a CSPIN is used, OFFSET is derived from decimal subtracting circuit 138 which decimally subtracts the customer selected P.I.N. from the ROM 136 generated P.I.N., the resulting OFFSET being recorded in field 14 of card 10. Card 10 may contain recorded thereon data such as institution identification number data and account number data prior to the issue thereof, wherein the data are read by the apparatus of FIG. 7 with conventional card reader means, such as a magnetic sensor, the apparatus generating OFFSET and P.I.N., the then recording the OFFSET number data onto the card. Alternatively, all data including OFFSET number data may be recorded onto the card at the time of issue wherein the institution identification and account number data are supplied to the apparatus of FIG. 7 and the identification data along with generated OFFSET number data are recorded onto the card.

Although the discussion of the present invention has been directed primarily toward the banking environment, it is to be understood that the invention is not so limited. It will be appreciated that the methods and apparatus disclosed herein are fully applicable to validating any card or other token bearing an account number and other indicia used for credit purposes, access to a security system or any other identification purposes.

Of particular importance, institution identification number data that are stored in register 26 for interrogation by central accounting system are applied both to initially address or key ROM 40 at the outset of a pseudo-random address cycle during verification of a card and to charge an authorized transaction to the identified institution. It is to be understood that while a two-digit institution identification number has been described by way of example, three or more digits can be utilized whereby two of the digits are selected as the key address byte for ROM 40 and central accounting system 28 being responsive to all the digits for identification.

While there has been described and illustrated one specific embodiment of the invention, it will be clear that variations of the details of construction which are specifically illustrated and described may be made without departing from the true spirit and scope of the invention. For example, it is understood that the account number and secret number can contain any number of digits; however, four secret number digits is a practical upper limit since the secret number is committed to memory by the customer. It is also understood that while each account number digit pseudo-randomly addresses ROM 40 seven times in the preferred embodiment, any other number could be used. Further, while output data generated by ROM 40 are EXCLUSIVE ORed with digits of the account number for generating pseudo-random addresses, it is understood that other suitable logical or arithmetic operations could be performed on the output data to provide generating of pseudo-random addresses, provided that the particular operation used does not substantially degrade randomness of the output data.

TABLE 1

| Sequence No. | $A_1 A_2$ | $Z_t$ | $I_1-I_R$ | $O_1-O_R$ |
|---|---|---|---|---|
| 2 | 10011000 | Φ | 10011000 | 11100011 |
| 3 | Φ | 0100 | 11100111 | 01001101 |
| 4 | Φ | 0100 | 01001001 | 11011100 |
| 5 | Φ | 0100 | 11011000 | 01110011 |
| 6 | Φ | 0100 | 01110111 | 11011110 |
| 7 | Φ | 0100 | 11011010 | 11000111 |
| 8 | Φ | 0100 | 11000011 | 10010101 |
| 9 | Φ | 0100 | 10010001 | 10111000 |

Φ = Don't Care

TABLE 2

| Sequence No. | $A_1 A_2$ | $Z_t$ | $I_1-I_R$ | $O_1-O_R$ |
|---|---|---|---|---|
| 112 | Φ |  |  | 10011001 |
| 113 | Φ | 0100 | 10011101 | 01001011 |
| 114 | Φ | 0100 | 01001111 | 01011101 |
| 115 | Φ | 0100 | 01011001 | 10111110 |
| 116 | Φ | 0100 | 10111010 | 11101001 |
| 117 | Φ | 0100 | 11101101 | 01101011 |
| 118 | Φ | 0100 | 01101111 | 10001001 |
| 119 | Φ | 0100 | 10001101 | 0101 0011 |

Φ = Don't care

☐ = most significant digit of P.I.N.

TABLE 3

| Decimal | Hexadecimal | Complement BCD* | BCD** | Decimal |
|---|---|---|---|---|
| 0 | 0000 | 1000 | 0111 | 7 |
| 1 | 0001 | 1001 | 0110 | 6 |
| 2 | 0010 | 1010 | 0101 | 5 |
| 3 | 0011 | 1011 | 0100 | 4 |
| 4 | 0100 | 1100 | 0011 | 3 |
| 5 | 0101 | 1101 | 0010 | 2 |
| 6 | 0110 | 0110 | 1001 | 9 |
| 7 | 0111 | 0111 | 1000 | 8 |
| 8 | 1000 | 1000 | 0111 | 7 |
| 9 | 1001 | 1001 | 0110 | 6 |
| 10 | 1010 | 1010 | 0101 | 5 |
| 11 | 1011 | 1011 | 0100 | 4 |
| 12 | 1100 | 1100 | 0011 | 3 |
| 13 | 1101 | 1101 | 0010 | 2 |
| 14 | 1110 | 1110 | 0001 | 1 |
| 15 | 1111 | 1111 | 0000 | 0 |

*Supplied to comparator 24 by converter 53
**Supplied to comparator 24 by keyboard 22

TABLE 4

| Clock Pulse No. | LD | IIN | CAN | PING | FS | ZSP | COMPCLK | DISPLAY | RESET |
|---|---|---|---|---|---|---|---|---|---|
| 1 | 1 | 0 | 0 | 0 | 0 | 0 | 0 | 0 | 0 |
| 2 | 0 | 1 | 0 | 0 | 1 | 0 | 0 | 0 | 0 |
| 3 | 0 | 0 | 1 | 0 | 1 | 0 | 0 | 0 | 0 |
| 4 | 0 | 0 | 1 | 0 | 1 | 0 | 0 | 0 | 0 |
| 5 | 0 | 0 | 1 | 0 | 1 | 0 | 0 | 0 | 0 |
| 6 | 0 | 0 | 1 | 0 | 1 | 0 | 0 | 0 | 0 |
| 7 | 0 | 0 | 1 | 0 | 1 | 0 | 0 | 0 | 0 |
| 8 | 0 | 0 | 1 | 0 | 1 | 0 | 0 | 0 | 0 |
| 9 | 0 | 0 | 1 | 0 | 1 | 0 | 0 | 0 | 0 |
| 10 | 0 | 0 | 1 | 0 | 0 | 1 | 0 | 0 | 0 |
| 11 | 0 | 0 | 1 | 0 | 0 | 1 | 0 | 0 | 0 |
| 12 | 0 | 0 | 1 | 0 | 0 | 1 | 0 | 0 | 0 |
| 13 | 0 | 0 | 1 | 0 | 0 | 1 | 0 | 0 | 0 |
| 14 | 0 | 0 | 1 | 0 | 1 | 0 | 0 | 0 | 0 |
| 15 | 0 | 0 | 1 | 0 | 1 | 0 | 0 | 0 | 0 |
| 16 | 0 | 0 | 1 | 0 | 1 | 0 | 0 | 0 | 0 |
| 17 | 0 | 0 | 1 | 0 | 1 | 0 | 0 | 0 | 0 |
| 18 | 0 | 0 | 1 | 0 | 1 | 0 | 0 | 0 | 0 |
| 19 | 0 | 0 | 1 | 0 | 1 | 0 | 0 | 0 | 0 |
| 20 | 0 | 0 | 1 | 0 | 1 | 0 | 0 | 0 | 0 |
| 21 | 0 | 0 | 1 | 0 | 0 | 1 | 0 | 0 | 0 |
| 22 | 0 | 0 | 1 | 0 | 0 | 1 | 0 | 0 | 0 |
| 23 | 0 | 0 | 1 | 0 | 0 | 1 | 0 | 0 | 0 |
| 24 | 0 | 0 | 1 | 0 | 0 | 1 | 0 | 0 | 0 |
| 25 | 0 | 0 | 1 | 0 | 1 | 0 | 0 | 0 | 0 |
| 26 | 0 | 0 | 1 | 0 | 1 | 0 | 0 | 0 | 0 |
| 27 | 0 | 0 | 1 | 0 | 1 | 0 | 0 | 0 | 0 |
| 28 | 0 | 0 | 1 | 0 | 1 | 0 | 0 | 0 | 0 |
| 29 | 0 | 0 | 1 | 0 | 1 | 0 | 0 | 0 | 0 |
| 30 | 0 | 0 | 1 | 0 | 1 | 0 | 0 | 0 | 0 |
| 31 | 0 | 0 | 1 | 0 | 1 | 0 | 0 | 0 | 0 |
| 32 | 0 | 0 | 1 | 0 | 0 | 1 | 0 | 0 | 0 |
| 33 | 0 | 0 | 1 | 0 | 0 | 1 | 0 | 0 | 0 |
| 34 | 0 | 0 | 1 | 0 | 0 | 1 | 0 | 0 | 0 |
| 35 | 0 | 0 | 1 | 0 | 0 | 1 | 0 | 0 | 0 |
| 36 | 0 | 0 | 1 | 0 | 1 | 0 | 0 | 0 | 0 |
| 37 | 0 | 0 | 1 | 0 | 1 | 0 | 0 | 0 | 0 |
| 38 | 0 | 0 | 1 | 0 | 1 | 0 | 0 | 0 | 0 |
| 39 | 0 | 0 | 1 | 0 | 1 | 0 | 0 | 0 | 0 |
| 40 | 0 | 0 | 1 | 0 | 1 | 0 | 0 | 0 | 0 |
| 41 | 0 | 0 | 1 | 0 | 1 | 0 | 0 | 0 | 0 |
| 42 | 0 | 0 | 1 | 0 | 1 | 0 | 0 | 0 | 0 |

TABLE 4-continued

| Clock Pulse No. | LD | IIN | CAN | PING | FS | ZSP | COMPCLK | DISPLAY | RESET |
|---|---|---|---|---|---|---|---|---|---|
| 43 | 0 | 0 | 1 | 0 | 0 | 1 | 0 | 0 | 0 |
| 44 | 0 | 0 | 1 | 0 | 0 | 1 | 0 | 0 | 0 |
| 45 | 0 | 0 | 1 | 0 | 0 | 1 | 0 | 0 | 0 |
| 46 | 0 | 0 | 1 | 0 | 0 | 1 | 0 | 0 | 0 |
| 47 | 0 | 0 | 1 | 0 | 1 | 0 | 0 | 0 | 0 |
| 48 | 0 | 0 | 1 | 0 | 1 | 0 | 0 | 0 | 0 |
| 49 | 0 | 0 | 1 | 0 | 1 | 0 | 0 | 0 | 0 |
| 50 | 0 | 0 | 1 | 0 | 1 | 0 | 0 | 0 | 0 |
| 51 | 0 | 0 | 1 | 0 | 1 | 0 | 0 | 0 | 0 |
| 52 | 0 | 0 | 1 | 0 | 1 | 0 | 0 | 0 | 0 |
| 53 | 0 | 0 | 1 | 0 | 1 | 0 | 0 | 0 | 0 |
| 54 | 0 | 0 | 1 | 0 | 0 | 1 | 0 | 0 | 0 |
| 55 | 0 | 0 | 1 | 0 | 0 | 1 | 0 | 0 | 0 |
| 56 | 0 | 0 | 1 | 0 | 0 | 1 | 0 | 0 | 0 |
| 57 | 0 | 0 | 1 | 0 | 0 | 1 | 0 | 0 | 0 |
| 58 | 0 | 0 | 1 | 0 | 1 | 0 | 0 | 0 | 0 |
| 59 | 0 | 0 | 1 | 0 | 1 | 0 | 0 | 0 | 0 |
| 60 | 0 | 0 | 1 | 0 | 1 | 0 | 0 | 0 | 0 |
| 61 | 0 | 0 | 1 | 0 | 1 | 0 | 0 | 0 | 0 |
| 62 | 0 | 0 | 1 | 0 | 1 | 0 | 0 | 0 | 0 |
| 63 | 0 | 0 | 1 | 0 | 1 | 0 | 0 | 0 | 0 |
| 64 | 0 | 0 | 1 | 0 | 1 | 0 | 0 | 0 | 0 |
| 65 | 0 | 0 | 1 | 0 | 0 | 1 | 0 | 0 | 0 |
| 66 | 0 | 0 | 1 | 0 | 0 | 1 | 0 | 0 | 0 |
| 67 | 0 | 0 | 1 | 0 | 0 | 1 | 0 | 0 | 0 |
| 68 | 0 | 0 | 1 | 0 | 0 | 1 | 0 | 0 | 0 |
| 69 | 0 | 0 | 1 | 0 | 1 | 0 | 0 | 0 | 0 |
| 70 | 0 | 0 | 1 | 0 | 1 | 0 | 0 | 0 | 0 |
| 71 | 0 | 0 | 1 | 0 | 1 | 0 | 0 | 0 | 0 |
| 72 | 0 | 0 | 1 | 0 | 1 | 0 | 0 | 0 | 0 |
| 73 | 0 | 0 | 1 | 0 | 1 | 0 | 0 | 0 | 0 |
| 74 | 0 | 0 | 1 | 0 | 1 | 0 | 0 | 0 | 0 |
| 75 | 0 | 0 | 1 | 0 | 1 | 0 | 0 | 0 | 0 |
| 76 | 0 | 0 | 1 | 0 | 0 | 1 | 0 | 0 | 0 |
| 77 | 0 | 0 | 1 | 0 | 0 | 1 | 0 | 0 | 0 |
| 78 | 0 | 0 | 1 | 0 | 0 | 1 | 0 | 0 | 0 |
| 79 | 0 | 0 | 1 | 0 | 0 | 1 | 0 | 0 | 0 |
| 80 | 0 | 0 | 1 | 0 | 1 | 0 | 0 | 0 | 0 |
| 81 | 0 | 0 | 1 | 0 | 1 | 0 | 0 | 0 | 0 |
| 82 | 0 | 0 | 1 | 0 | 1 | 0 | 0 | 0 | 0 |
| 83 | 0 | 0 | 1 | 0 | 1 | 0 | 0 | 0 | 0 |
| 84 | 0 | 0 | 1 | 0 | 1 | 0 | 0 | 0 | 0 |
| 85 | 0 | 0 | 1 | 0 | 1 | 0 | 0 | 0 | 0 |
| 86 | 0 | 0 | 1 | 0 | 1 | 0 | 0 | 0 | 0 |
| 87 | 0 | 0 | 1 | 0 | 0 | 1 | 0 | 0 | 0 |
| 88 | 0 | 0 | 1 | 0 | 0 | 1 | 0 | 0 | 0 |
| 89 | 0 | 0 | 1 | 0 | 0 | 1 | 0 | 0 | 0 |
| 90 | 0 | 0 | 1 | 0 | 0 | 1 | 0 | 0 | 0 |
| 91 | 0 | 0 | 1 | 0 | 1 | 0 | 0 | 0 | 0 |
| 92 | 0 | 0 | 1 | 0 | 1 | 0 | 0 | 0 | 0 |
| 93 | 0 | 0 | 1 | 0 | 1 | 0 | 0 | 0 | 0 |
| 94 | 0 | 0 | 1 | 0 | 1 | 0 | 0 | 0 | 0 |
| 95 | 0 | 0 | 1 | 0 | 1 | 0 | 0 | 0 | 0 |
| 96 | 0 | 0 | 1 | 0 | 1 | 0 | 0 | 0 | 0 |
| 97 | 0 | 0 | 1 | 0 | 1 | 0 | 0 | 0 | 0 |
| 98 | 0 | 0 | 1 | 0 | 0 | 1 | 0 | 0 | 0 |
| 99 | 0 | 0 | 1 | 0 | 0 | 1 | 0 | 0 | 0 |
| 100 | 0 | 0 | 1 | 0 | 0 | 1 | 0 | 0 | 0 |
| 101 | 0 | 0 | 1 | 0 | 0 | 1 | 0 | 0 | 0 |
| 102 | 0 | 0 | 1 | 0 | 1 | 0 | 0 | 0 | 0 |
| 103 | 0 | 0 | 1 | 0 | 1 | 0 | 0 | 0 | 0 |
| 104 | 0 | 0 | 1 | 0 | 1 | 0 | 0 | 0 | 0 |
| 105 | 0 | 0 | 1 | 0 | 1 | 0 | 0 | 0 | 0 |
| 106 | 0 | 0 | 1 | 0 | 1 | 0 | 0 | 0 | 0 |
| 107 | 0 | 0 | 1 | 0 | 1 | 0 | 0 | 0 | 0 |
| 108 | 0 | 0 | 1 | 0 | 1 | 0 | 0 | 0 | 0 |
| 109 | 0 | 0 | 1 | 0 | 0 | 1 | 0 | 0 | 0 |
| 110 | 0 | 0 | 1 | 0 | 0 | 1 | 0 | 0 | 0 |
| 111 | 0 | 0 | 1 | 0 | 0 | 1 | 0 | 0 | 0 |
| 112 | 0 | 0 | 1 | 0 | 0 | 1 | 0 | 0 | 0 |
| 113 | 0 | 0 | 1 | 0 | 1 | 0 | 0 | 0 | 0 |
| 114 | 0 | 0 | 1 | 0 | 1 | 0 | 0 | 0 | 0 |
| 115 | 0 | 0 | 1 | 0 | 1 | 0 | 0 | 0 | 0 |
| 116 | 0 | 0 | 1 | 0 | 1 | 0 | 0 | 0 | 0 |
| 117 | 0 | 0 | 1 | 0 | 1 | 0 | 0 | 0 | 0 |
| 118 | 0 | 0 | 1 | 0 | 1 | 0 | 0 | 0 | 0 |
| 119 | 0 | 0 | 1 | 0 | 1 | 0 | 0 | 0 | 0 |
| 120 | 0 | 0 | 0 | 1 | 0 | 0 | 0 | 0 | 0 |
| 121 | 0 | 0 | 0 | 1 | 0 | 0 | 0 | 0 | 0 |
| 121 | 0 | 0 | 0 | 1 | 0 | 0 | 0 | 0 | 0 |
| 122 | 0 | 0 | 0 | 1 | 0 | 0 | 0 | 0 | 0 |
| 123 | 0 | 0 | 0 | 1 | 0 | 0 | 1 | 0 | 0 |
| 124 | 0 | 0 | 0 | 1 | 0 | 0 | 0 | 0 | 0 |
| 125 | 0 | 0 | 0 | 1 | 0 | 0 | 0 | 0 | 0 |
| 126 | 0 | 0 | 0 | 1 | 0 | 0 | 0 | 0 | 0 |
| 127 | 0 | 0 | 1 | 0 | 0 | 1 | 0 | 0 | 0 |
| 128 | 0 | 0 | 1 | 0 | 0 | 1 | 0 | 0 | 0 |
| 129 | 0 | 0 | 1 | 0 | 0 | 1 | 0 | 0 | 0 |
| 130 | 0 | 0 | 1 | 0 | 0 | 1 | 0 | 0 | 0 |

TABLE 4-continued

| Clock Pulse No. | LD | IIN | CAN | PING | FS | ZSP | COMPCLK | DISPLAY | RESET |
|---|---|---|---|---|---|---|---|---|---|
| 131 | 0 | 0 | 1 | 0 | 1 | 0 | 0 | 0 | 0 |
| 132 | 0 | 0 | 1 | 0 | 1 | 0 | 0 | 0 | 0 |
| 133 | 0 | 0 | 1 | 0 | 1 | 0 | 0 | 0 | 0 |
| 134 | 0 | 0 | 1 | 0 | 1 | 0 | 0 | 0 | 0 |
| 135 | 0 | 0 | 1 | 0 | 1 | 0 | 0 | 0 | 0 |
| 136 | 0 | 0 | 1 | 0 | 1 | 0 | 0 | 0 | 0 |
| 137 | 0 | 0 | 1 | 0 | 1 | 0 | 0 | 0 | 0 |
| 138 | 0 | 0 | 0 | 1 | 0 | 0 | 0 | 0 | 0 |
| 139 | 0 | 0 | 0 | 1 | 0 | 0 | 0 | 0 | 0 |
| 140 | 0 | 0 | 0 | 1 | 0 | 0 | 0 | 0 | 0 |
| 141 | 0 | 0 | 0 | 1 | 0 | 0 | 1 | 0 | 0 |
| 142 | 0 | 0 | 0 | 1 | 0 | 0 | 0 | 0 | 0 |
| 143 | 0 | 0 | 0 | 1 | 0 | 0 | 0 | 0 | 0 |
| 144 | 0 | 0 | 0 | 1 | 0 | 0 | 0 | 0 | 0 |
| 145 | 0 | 0 | 1 | 0 | 0 | 1 | 0 | 0 | 0 |
| 146 | 0 | 0 | 1 | 0 | 0 | 1 | 0 | 0 | 0 |
| 147 | 0 | 0 | 1 | 0 | 0 | 1 | 0 | 0 | 0 |
| 148 | 0 | 0 | 1 | 0 | 0 | 1 | 0 | 0 | 0 |
| 149 | 0 | 0 | 1 | 0 | 1 | 0 | 0 | 0 | 0 |
| 150 | 0 | 0 | 1 | 0 | 1 | 0 | 0 | 0 | 0 |
| 151 | 0 | 0 | 1 | 0 | 1 | 0 | 0 | 0 | 0 |
| 152 | 0 | 0 | 1 | 0 | 1 | 0 | 0 | 0 | 0 |
| 153 | 0 | 0 | 1 | 0 | 1 | 0 | 0 | 0 | 0 |
| 154 | 0 | 0 | 1 | 0 | 1 | 0 | 0 | 0 | 0 |
| 155 | 0 | 0 | 1 | 0 | 1 | 0 | 0 | 0 | 0 |
| 156 | 0 | 0 | 0 | 1 | 0 | 0 | 0 | 0 | 0 |
| 157 | 0 | 0 | 0 | 1 | 0 | 0 | 0 | 0 | 0 |
| 158 | 0 | 0 | 0 | 1 | 0 | 0 | 0 | 0 | 0 |
| 159 | 0 | 0 | 0 | 1 | 0 | 0 | 1 | 0 | 0 |
| 160 | 0 | 0 | 0 | 1 | 0 | 0 | 0 | 0 | 0 |
| 161 | 0 | 0 | 0 | 1 | 0 | 0 | 0 | 0 | 0 |
| 162 | 0 | 0 | 0 | 1 | 0 | 0 | 0 | 0 | 0 |
| 163 | 0 | 0 | 1 | 0 | 0 | 1 | 0 | 0 | 0 |
| 164 | 0 | 0 | 1 | 0 | 0 | 1 | 0 | 0 | 0 |
| 165 | 0 | 0 | 1 | 0 | 0 | 1 | 0 | 0 | 0 |
| 166 | 0 | 0 | 1 | 0 | 0 | 1 | 0 | 0 | 0 |
| 167 | 0 | 0 | 1 | 0 | 1 | 0 | 0 | 0 | 0 |
| 168 | 0 | 0 | 1 | 0 | 1 | 0 | 0 | 0 | 0 |
| 169 | 0 | 0 | 1 | 0 | 1 | 0 | 0 | 0 | 0 |
| 170 | 0 | 0 | 1 | 0 | 1 | 0 | 0 | 0 | 0 |
| 171 | 0 | 0 | 1 | 0 | 1 | 0 | 0 | 0 | 0 |
| 172 | 0 | 0 | 1 | 0 | 1 | 0 | 0 | 0 | 0 |
| 173 | 0 | 0 | 1 | 0 | 1 | 0 | 0 | 0 | 0 |
| 174 | 0 | 0 | 0 | 1 | 0 | 0 | 0 | 0 | 0 |
| 175 | 0 | 0 | 0 | 1 | 0 | 0 | 0 | 0 | 0 |
| 176 | 0 | 0 | 0 | 1 | 0 | 0 | 0 | 0 | 0 |
| 177 | 0 | 0 | 0 | 1 | 0 | 0 | 1 | 0 | 0 |
| 178 | 0 | 0 | 0 | 1 | 0 | 0 | 0 | 0 | 0 |
| 179 | 0 | 0 | 0 | 1 | 0 | 0 | 0 | 0 | 0 |
| 180 | 0 | 0 | 0 | 1 | 0 | 0 | 0 | 0 | 0 |
| 181 | 0 | 0 | 0 | 0 | 0 | 0 | 0 | 1 | 0 |
| 182 | 0 | 0 | 0 | 0 | 0 | 0 | 0 | 0 | 1 |

I claim:

1. Apparatus for generating a signal representing a pseudo-random number in response to first and second input signals respectively representing known numbers comprising: an addressable memory means, means responsive to said first input signal for addressing a memory location of said memory means and causing said memory means to generate a first output signal, and means for logically combining said first output signal and said second input signal for deriving another signal for addressing said memory means and causing said memory means to generate the signal representing the pseudo-random number.

2. In a system for issuing an identification card containing data including indicia indicative of an institution identification number and an account number, an apparatus for generating digits of secret number data corresponding to the named data, the apparatus comprising:

memory means programmed to contain random bytes;

means responsive to said institution identification number indicia for addressing a memory location of said memory means and causing said memory means to generate an output byte;

means for logically combining a portion of said memory output byte with a digit of said account number indicia to form a combined signal; and means for addressing said memory means with said combined signal and for causing said memory means to generate a digit of said secret number.

3. The apparatus of claim 2 including means for displaying said digits.

4. In a card verification system of the type which translates an account number contained on a card into a translated number and then correlates the translated number with a secret number known only to the authorized holder of the card to provide a signal indicative of the validity of the card, the improvement comprising:

means responsive to institution identification data contained on said card for determining the translation of said account number; and means responsive to said institution identification data for charging a transaction to an identified institution.

5. The system of claim 4 wherein said translation determining means includes an addressable memory means containing bytes randomly stored therein, said institution identification data forming an initial address byte for pseudo-randomly addressing said addressable memory means.

6. The system of claim 4 wherein said transaction charging means includes storage register means for storing said institution identification number data, and means for transferring said institution identification number data to a central accounting system.

7. A system for determining whether the holder of a card is authorized to complete a transaction, the card containing first data identifying an institution and second data identifying an account number, said holder supplying to the system secret number data derived from said first and second data, the system comprising:
    an addressable memory means;
    means responsive to said first data for addressing a memory location of the memory means and causing said memory means to generate a first output signal;
    means responsive to said first output signal and said second data for addressing said memory means and causing said memory means to generate a second output signal;
    means for comparing said second output signal with said secret number data and for generating a go or no go signal;
    means for generating a validation signal in accordance with said go or no go signal; and
    means for charging an authorized transaction to an institution identified by said first data.

8. The system of claim 7 wherein said addressing means responsive to said first output signal and said second data includes means for logically combining said first output signal and second data to form an address byte for said memory means.

9. The system of claim 7 wherein said comparing means includes an EXCLUSIVE OR circuit for comparing bits of said second output signal with bits of said secret number data.

10. The system of claim 7 wherein said charging means includes storage register means for storing said first data, and means for supplying said stored data to a central accounting system.

11. Apparatus for verifying the authenticity of a card, said card containing identification data, wherein data derived from the identification data are correlated with secret number data selected by the customer, comprising:
    first means for translating said identification data contained on said card into first translated data;
    second means for translating said customer selected number data into second translated data; and
    means for correlating said first translated data with said second translated data and for generating a go or no go signal.

12. The apparatus of claim 11 wherein said second means includes means for combining said customer selected secret number data with offset number data to generate said second translated data.

13. The apparatus of claim 12 wherein said combining means includes an addressable memory means which is programmed to generate said second translated data in response to said customer selected secret number data and said offset number data.

14. The apparatus of claim 12 wherein said combining means includes means for adding said offset number data and said customer selected secret number data without carry.

15. The apparatus of claim 11 wherein said identification data includes first and second data segments and said first translating means includes addressable memory means; and means responsive to said first and second data segments for pseudo-randomly addressing said addressable memory means.

16. The apparatus of claim 15 wherein said pseudo-random addressing means includes means responsive to said first data segment for addressing a memory location of said memory means and causing said memory means to generate a first output signal; and means responsive to said first output signal and said second data segment for addressing said memory means and causing said memory means to generate said first translated data.

17. A transaction interchange system among cooperating financial institutions, said institutions issuing to authorized customers a standard card containing data including institution identification number data and account number data, wherein each authorized customer enters secret number data derived from said identification and account number data, said system comprising:
    means for translating said institution identification number data and said account number data into identification data representative of a nonascertainable personal identification number;
    means for correlating said identification data with said secret number data to provide a go or no-go signal; and
    means responsive to said go signal and said institution identification number data for charging a requested transaction to an institution identified by said identification number data.

18. The transaction interchange system of claim 17 wherein said translating means includes an addressable memory means having random bytes stored therein and said system further includes means for pseudo-randomly addressing storage locations of said addressable memory means to generate output bytes, certain of said bytes including digits of said nonascertainable personal identification number.

19. The transaction interchange system of claim 18 wherein said translating means further includes means for successively logically combining data generated by said addressable memory means with digits of said account number data to form pseudo-random address bytes for addressing storage locations of said addressable memory means.

20. The transaction interchange system of claim 17 wherein said correlating means comprises a digital comparator.

21. A system for issuing an identification medium containing data that are translatable to identification data, said identification data being correlatable to selected number data, comprising:
    means for translating said selected number data to said identification data;
    means for combining said selected number data and said identification data to generate offset number data, and
    means for recording said offset number data onto said identification medium.

22. The system of claim 21 wherein said combining means includes means for numerically subtracting said selected number data from said identification data.

23. The system of claim 21 wherein said medium contained data are magnetically recorded thereon, including means for magnetically sensing said recorded data and said recording means includes means for magnetically recording said offset number data on said medium.

24. A card verification system for verifying whether a customer presenting an identification card is authorized to complete a transaction, the card containing identification data that is correlatable to secret number data selected by the authorized customer at the time the card is issued, comprising:
first means for translating said identification data into first translated data;
second means for translating said selected data into second translated data;
means for comparing said first and second translated data and generating a go or no go signal; and
means responsive to said go signal for authorizing a requested transaction.

25. The system of claim 24 wherein said card contained data includes first and second segments, and said first translating means includes means responsive to said first and second segments for pseudo-randomly addressing an addressable memory means and generating an output signal indicative of said first translated data.

26. The system of claim 25 further including means responsive to one of said segments for charging a completed transaction to an institution identified by said one segment.

27. The system of claim 25 wherein said second means includes means for combining said selected data and offset data and generating an output signal representative of said second translated data.

28. The system of claim 27 wherein said combining means includes an addressable memory means, said selected and offset data forming an address byte for addressing storage locations in said addressable memory means.

29. Method of generating a signal representing a pseudo-random number in response to first and second input signals respectively representing known numbers comprising the steps of:
addressing a memory location in an addressable memory means with said first input signals to cause said memory means to generate a first output signal;
combining logically said first output signal with said second input signal to provide combined signals;
addressing said memory means with said combined signals to cause said memory means to generate the signal representing the pseudo-random number; and
displaying the generated pseudo-random number signal.

30. Method of verifying that the holder of a card is authorized to use the terminal of a connected system, said card containing offset data and at least first and second data, said authorized holder having memorized secret number data selected by the authorized holder at the time of issue of the card, comprising the steps of:
pseudo-randomly addressing memory locations in a first addressable memory means with said first and second data to cause said memory means to generate first output data;
addressing memory locations in a second addressable memory means with said secret number data and offset number data to cause said second memory means to generate second output data;
correlating said first and second output data; and
generating a go or no go signal according to the result of said step of correlating.

31. The method of claim 30 including the step of charging an authorized transaction to an institution identified by said first data.

32. The method of claim 30 wherein said offset number data are contained on said card.

33. The method of claim 30 wherein said step of pseudo-random addressing includes the steps of:
addressing a memory location in said first addressable memory means and causing said first addressable memory means to generate a first output signal;
logically combining said first output signal and said second data to form a composite signal; and
addressing said first addressable means with said composite signal and causing said second addressable memory means to generate said first output data.

34. A method of determining whether the holder of a card is the authorized holder, said card containing first data identifying an institution and second data identifying an account number, wherein said authorized holder is in sole possession of a secret number derived from said first and second data, the method comprising the steps of:
scanning said card and converting said first and second data contained thereon into electrical signals;
converting said secret number into electrical signals;
addressing a memory location of addressable memory means with said first data causing said memory means to generate a first output signal;
logically combining said first output signal with said second data signal;
addressing said memory means with said combined signal causing said memory means to generate a second output signal;
comparing said second output signal with said secret number signal; and
generating a validation signal in accordance with the result of said comparison.

35. The method of claim 34 including the step of:
charging an authorized transaction to an institution identified by said first data.

36. Method of generating secret number data from data to be recorded on a card medium, said data including first number data identifying an institution and second number identifying an account at said institution, comprising the steps of:
a. addressing an addressable memory means having random data stored therein with said first number data and causing said memory means to generate output data;
b. logically combining said output data with one digit of said account number data to form first combined data;
c. addressing said memory means with said first combined data, and causing said memory means to generate new output data;
d. repeating steps (b) and (c) $n$ times, $n > 0$;
e. repeating steps (b), (c), and (d) for each remaining digit of said account number;
f. repeating steps (b), (c), and (d) for one digit of said account number; and g. displaying output data from said memory means, said data including a first digit of said secret number data.

37. The method of claim 36 including the steps of:
repeating step (f) for at least one other digit of said account number data; and
displaying resulting data from said memory means; said resulting data including remaining digits of said secret number data.

38. Method of determining whether the holder of a card is authorized to complete a requested transaction at an on-line terminal of an institution in a network of cooperating institutions, said card containing data including first number data identifying an institution and second number data identifying an account at said institution, said holder of said card having memorized secret number data associated with said card contained data, comprising the steps of:
 a. storing said secret number data;
 b. addressing an addressable memory means having random data stored therein with said first number data and causing said memory means to generate output data;
 c. logically combining said output data with one digit of said account number data to form first combined data;
 d. addressing said memory means with said first combined data, and causing said memory means to generate new output data;
 e. repeating steps (c) and (d) $n$ times, $n > 0$;
 f. repeating steps (c), (d), and (e) for each remaining digit of said account number;
 g. repeating steps (c), (d) and (e) for one digit of said account number;
 h. storing output data from said memory means, said data including a first digit of generated secret number data;
 i. correlating said generated secret number data with said memorized secret number data; and
 j. generating a go or no go signal indicative of the result of step (i).

39. The method of claim 38 including the added steps of:
repeating step (g) for at least one other digit of said account number data; and
storing resulting data from said memory means, said resulting data including remaining digits of said generated secret number data;
said added steps immediately following step (h).

40. The method of claim 38 including the step of charging said requested transaction to the institution identified by said first number data responsive to said go signal.

41. Apparatus for verifying the authenticity of a card, said card containing identification data, wherein data derived from the identification data are correlated with manually entered secret number data selected by the customer, comprising:
first means for translating said identification data contained on said card into first translated data;
second means for translating said customer selected number data into second translated data; and
means for correlating said first translated data with said second translated data and for generating a go or no-go signal.

* * * * *

UNITED STATES PATENT AND TRADEMARK OFFICE
CERTIFICATE OF CORRECTION

PATENT NO. : 4,016,405         Page 1 of 2

DATED : April 5, 1977

INVENTOR(S) : Harold K. McCune and Michael R. Kronewitter

It is certified that error appears in the above–identified patent and that said Letters Patent are hereby corrected as shown below:

Column 1, line 6 --- "system" should be - <u>system</u> -
Column 1, line 15 -- "and" should be - <u>an</u> -
Column 1, line 42 -- "along" should be - <u>alone</u> -

Column 2, line 50 -- "one" should be - on -

Column 3, line 2 --- Insert the following phrase after the word "holder": - <u>to withdraw cash against the account of the authorized holder</u> -
Column 5, line 6 --- "diaram" should be - <u>diagram</u> -
Column 6, line 51 -- Underscore the word "infra"
Column 6, line 60 -- Underscore the word "infra"
Column 7, line 43 -- Underscore the word "infra"
Column 8, line 28 -- "key" should be -<u>"key"</u>-
Column 9, line 43 -- Underscore the word "infra"
Column 9, line 48 -- "ROm" should be - <u>ROM</u> -
Column 10, line 34 - Underscore the word "infra"
Column 10, line 52 - Underscore the word "infra"
Column 11, line 63 - Underscore the word "infra"
Column 13, line 36 - "of" should be - <u>is</u> -
Column 14, line 45 - "Q" should be - <u>Q</u> -
Column 17, line 11 - "-" should be - $\pm$ -

UNITED STATES PATENT OFFICE
CERTIFICATE OF CORRECTION

Patent No. 4,016,405  Dated April 5, 1977

Inventor(s) Harold K. McCune and Michael R. Kronewitter

It is certified that error appears in the above-identified patent and that said Letters Patent are hereby corrected as shown below:

Column 18, line 37, "the then" should read -- and then --.

Signed and Sealed this twenty-sixth Day of July 1977

[SEAL]

Attest:

RUTH C. MASON
*Attesting Officer*

C. MARSHALL DANN
*Commissioner of Patents and Trademarks*